US012453729B2

(12) United States Patent
Al Husban

(10) Patent No.: US 12,453,729 B2
(45) Date of Patent: *Oct. 28, 2025

(54) PHARMACEUTICAL FORMULATIONS

(71) Applicant: AstraZeneca AB, Södertälje (SE)

(72) Inventor: Farhan Abdel Karim Mohammad Al Husban, Cambridge (GB)

(73) Assignee: AstraZeneca AB, Sodertalje (SE)

( * ) Notice: Subject to any disclaimer, the term of this patent is extended or adjusted under 35 U.S.C. 154(b) by 183 days.

This patent is subject to a terminal disclaimer.

(21) Appl. No.: 17/237,201

(22) Filed: Apr. 22, 2021

(65) Prior Publication Data

US 2021/0330665 A1 Oct. 28, 2021

Related U.S. Application Data

(60) Provisional application No. 63/014,923, filed on Apr. 24, 2020.

(51) Int. Cl.
*A61K 31/4745* (2006.01)
*A61K 9/20* (2006.01)
*A61K 9/28* (2006.01)

(52) U.S. Cl.
CPC ........ *A61K 31/4745* (2013.01); *A61K 9/2009* (2013.01); *A61K 9/2013* (2013.01); *A61K 9/2054* (2013.01); *A61K 9/2095* (2013.01); *A61K 9/284* (2013.01); *A61K 9/2866* (2013.01)

(58) Field of Classification Search
CPC .............. A61K 31/4745; A61K 9/2009; A61K 9/2013; A61K 9/2054; A61K 9/2095; A61K 9/284; A61K 9/2866; A61K 9/2077
See application file for complete search history.

(56) References Cited

U.S. PATENT DOCUMENTS

| | | | |
|---|---|---|---|
| 2005/0075335 A1 | 4/2005 | Buxton et al. | |
| 2009/0156557 A1 | 6/2009 | Brown et al. | |
| 2011/0104271 A1 | 5/2011 | Thoorens et al. | |
| 2012/0157402 A1 | 6/2012 | Cao et al. | |
| 2012/0302550 A1* | 11/2012 | Basford | A61P 27/06 540/521 |
| 2014/0357661 A1 | 12/2014 | Akhtar et al. | |

(Continued)

FOREIGN PATENT DOCUMENTS

| | | |
|---|---|---|
| CN | 106518768 A | 3/2017 |
| CN | 107814798 A | 3/2018 |

(Continued)

OTHER PUBLICATIONS

Lu, et al. (Design and Synthesis of Basic Selective Estrogen Receptor Degraders for Endocrine Therapy Resistant Breast Cancer, Journal of Medicinal Chemistry, 62, pp. 11301-11323) (Year: 2019).*

(Continued)

*Primary Examiner* — Marianne C Seidel
*Assistant Examiner* — Joshua A Atkinson
(74) *Attorney, Agent, or Firm* — McCarter & English, LLP; Steven G. Davis

(57) ABSTRACT

The present specification relates to pharmaceutical formulations comprising N-(1-(3-fluoropropyl)azetidin-3-yl)-6-((6S,8R)-8-methyl-7-(2,2,2-trifluoroethyl)-6,7,8,9-tetrahydro-3H-pyrazolo[4,3-f]isoquinolin-6-yl)pyridin-3-amine, microcrystalline cellulose (MCC) and dicalcium phosphate anhydrous (DCPA), for example tablets with immediate release properties.

21 Claims, 8 Drawing Sheets

(56) References Cited

U.S. PATENT DOCUMENTS

Figure 1:
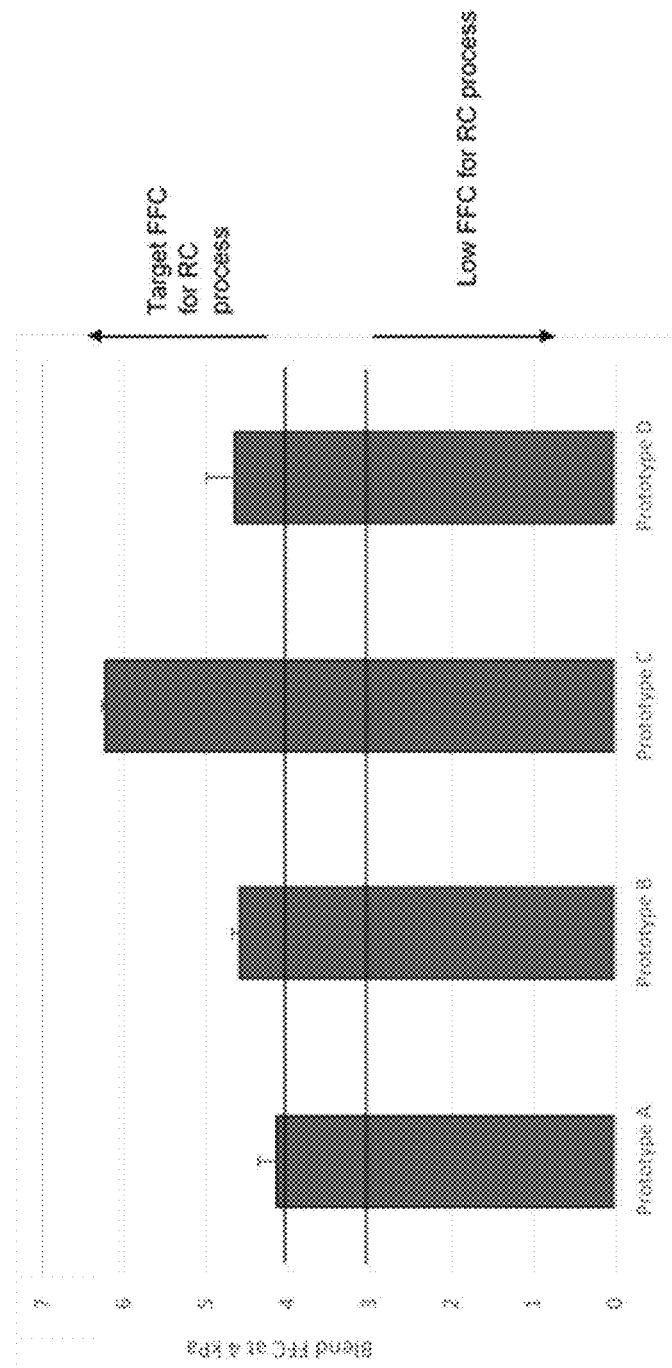

| | | |
|---|---|---|
| 2016/0175289 A1 | 6/2016 | Charles et al. |
| 2018/0021316 A1 | 1/2018 | Barlaam et al. |
| 2018/0111931 A1* | 4/2018 | Barlaam .............. A61K 31/497 |

FOREIGN PATENT DOCUMENTS

| | | |
|---|---|---|
| WO | 2002012242 A2 | 2/2002 |
| WO | 2006101434 A1 | 9/2006 |
| WO | 2006108948 A2 | 10/2006 |
| WO | 2007060198 A1 | 5/2007 |
| WO | 2010138695 A1 | 12/2010 |
| WO | 2010138758 A1 | 12/2010 |
| WO | 2011156518 A2 | 12/2011 |
| WO | 2011159769 A2 | 12/2011 |
| WO | 2013090829 A1 | 6/2013 |
| WO | 2013090836 A1 | 6/2013 |
| WO | 2014101986 A1 | 7/2014 |
| WO | 2014191726 A1 | 12/2014 |
| WO | 2014205136 A1 | 12/2014 |
| WO | 2014205138 A1 | 12/2014 |
| WO | 2015092634 A1 | 6/2015 |
| WO | 2016097071 A1 | 6/2016 |
| WO | 2016097072 A1 | 6/2016 |
| WO | 2016097073 A1 | 6/2016 |
| WO | 2016174551 A1 | 11/2016 |
| WO | 2016189011 A1 | 12/2016 |
| WO | 2016202161 A1 | 12/2016 |
| WO | 2017059139 A1 | 4/2017 |
| WO | 2017080338 A1 | 5/2017 |
| WO | 2017080966 A1 | 5/2017 |
| WO | 2017107754 A1 | 6/2017 |
| WO | 2017174757 A1 | 10/2017 |
| WO | 2017182493 A1 | 10/2017 |
| WO | 2017192991 A1 | 11/2017 |
| WO | 2018001232 A1 | 1/2018 |
| WO | 2018053354 A1 | 3/2018 |
| WO | 2018076090 A1 | 5/2018 |
| WO | 2018077630 A1 | 5/2018 |
| WO | 2018108671 A1 | 6/2018 |
| WO | 2018109607 A1 | 6/2018 |
| WO | 2018111315 A1 | 6/2018 |
| WO | 2018111707 A1 | 6/2018 |
| WO | 2018112379 A1 | 6/2018 |
| WO | 2018112382 A1 | 6/2018 |
| WO | 2018138293 A1 | 8/2018 |

OTHER PUBLICATIONS

Anonymous, "Advantages of calcium phosphate based excipients in pharmaceutical formulations development", Express Pharma, Nov. 26, 2019.

Baird et al., "Abstract PS11-05: Updated data from SERENA-1: A Phase 1 dose escalation and expansion study of the next generation oral SERD AZD9833 as a monotherapy and in combination with Palbociclib, in women with ER-positive, HER2-negative advanced breast cancer", Journal of Cancer Research, Feb. 1, 2021.

Cancer Prevention Overview (PDQ)-National Cancer Institute, "What is prevention?", May 25, 2012.

Chesworth et al., "Tetrahydroisoquinolines as subtype selective estrogen agonists/antagonists", Bioorg. and Med. Chem. Lett, 2004, 14(11), 2729-2733.

Golub, TR., "Molecular classification of cancer: class discovery and class prediction by gene expression monitoring." Science. Oct. 15, 1999;286(5439):531-7.

Gu et al., "Targeted therapy for breast cancer and molecular mechanisms of resistance to treatment", Current Opinion in Pharmacology, Nov. 22, 2016, pp. 97-103, vol. 31, Elsevier Science Publishers, NL.

Hamilton et al., "A phase I dose escalation and expansion study of the next generation oral SERD AZD9833 in women with ER-positive, HER2-negative advanced breast cancer", Journal of Clinical Oncology, May 20, 2020, 1024-1024.

Kochhar et al., "Slugging and recompression characterisation of some blends of pharmaceutical excipients", International Journal of Pharmaceutics, Dec. 5, 1994, pp. 225-231, vol. 112, No. 3, Elsevier, NL.

International Search Report and Written Opinion for International Application No. PCT/EP2017/076191, dated Nov. 10, 2017.

Scott et al., "Discovery of AZD9833, a Potent and Orally Bioavailable Selective Estrogen Receptor Degrader and Antagonist", Journal of Medicinal Chemistry, Sep. 10, 2020, 63, 23, pp. 14530-14559.

Targeted Cancer Therapies Fact Sheet-National Cancer Institute, "What are targeted cancer therapies?", Dec. 8, 2015.

* cited by examiner

PHARMACEUTICAL FORMULATIONS

CROSS-REFERENCE TO RELATED APPLICATION

This application claims the benefit under 35 U.S.C. § 119 (e) of U.S. Provisional Application No. 63/014,923, filed on Apr. 24, 2020. The above-listed application is incorporated by reference herein in its entirety.

FIELD

The present specification relates to pharmaceutical formulations comprising the selective estrogen receptor down-regulator (SERD) N-(1-(3-fluoropropyl)azetidin-3-yl)-6-((6S,8R)-8-methyl-7-(2,2,2-trifluoroethyl)-6,7,8,9-tetrahydro-3H-pyrazolo[4,3-f]isoquinolin-6-yl)pyridin-3-amine (herein also referred to as Compound (I) or AZD9833), or a pharmaceutically acceptable salt thereof, and selected pharmaceutically acceptable excipients. In particular, the specification relates to oral solid dosage forms, for example tablets, comprising Compound (I) and selected pharmaceutically acceptable excipients. The pharmaceutical formulations according to the specification have advantageous properties that allow for large scale manufacture of oral dosage forms with immediate release properties. Formulations according to the specification exhibit good storage stability and physical properties. The formulations according to the specification may be used in methods of treatment, for example methods for treating a patient suffering from breast or gynaecological cancer, involving once daily oral administration of a formulation comprising Compound (I) in a specified dose to a patient in need thereof.

Compound (I)

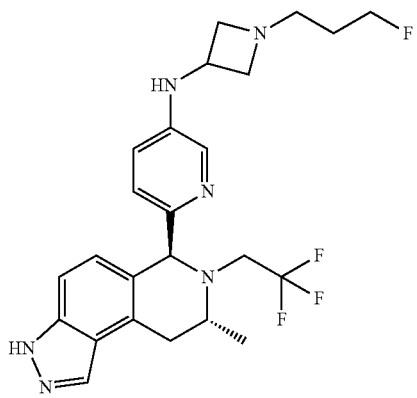

BACKGROUND

Estrogen receptor alpha (ERα, ESR1, NR3A) and estrogen receptor beta (ERβ, ESR2, NR3b) are steroid hormone receptors which are members of the large nuclear receptor family. Structured similarly to all nuclear receptors, ERα is composed of six functional domains (named A-F) (Dahlman-Wright, et al., *Pharmacol. Rev.,* 2006, 58:773-781) and is classified as a ligand-dependent transcription factor because after its association with the specific ligand, (the female sex steroid hormone 17b estradiol (E2)), the complex binds to genomic sequences, named Estrogen Receptor Elements (ERE) and interacts with co-regulators to modulate the transcription of target genes. The ERα gene is located on 6q25.1 and encodes a 595AA protein and multiple isoforms can be produced due to alternative splicing and translational start sites. In addition to the DNA binding domain (Domain C) and the ligand binding domain (Domain E) the receptor contains a N-terminal (A/B) domain, a hinge (D) domain that links the C and E domains and a C-terminal extension (F domain). While the C and E domains of ERα and ERβ are quite conserved (96% and 55% amino acid identity respectively) conservation of the A/B, D and F domains is poor (below 30% amino acid identity). Both receptors are involved in the regulation and development of the female reproductive tract and in addition play roles in the central nervous system, cardiovascular system and in bone metabolism. The genomic action of ERs occurs in the nucleus of the cell when the receptor binds EREs directly (direct activation or classical pathway) or indirectly (indirect activation or non-classical pathway). In the absence of ligand, ERs are associated with heat shock proteins, Hsp90 and Hsp70, and the associated chaperone machinery stabilizes the ligand binding domain (LBD) making it accessible to ligand. Liganded ER dissociates from the heat shock proteins leading to a conformational change in the receptor that allows dimerisation, DNA binding, interaction with co-activators or co-repressors and modulation of target gene expression. In the non-classical pathway, AP-1 and Sp-1 are alternative regulatory DNA sequences used by both isoforms of the receptor to modulate gene expression. In this example, ER does not interact directly with DNA but through associations with other DNA bound transcription factors e.g. c-Jun or c-Fos (Kushner et al., *Pure Applied Chemistry* 2003, 75:1757-1769). The precise mechanism whereby ER affects gene transcription is poorly understood but appears to be mediated by numerous nuclear factors that are recruited by the DNA bound receptor. The recruitment of co-regulators is primarily mediated by two protein surfaces, AF2 and AF1 which are located in E-domain and the A/B domain respectively. AF1 is regulated by growth factors and its activity depends on the cellular and promoter environment whereas AF2 is entirely dependent on ligand binding for activity. Although the two domains can act independently, maximal ER transcriptional activity is achieved through synergistic interactions via the two domains (Tzukerman, et al., *Mol. Endocrinology,* 1994, 8:21-30). Although ERs are considered transcription factors they can also act through non-genomic mechanisms as evidenced by rapid ER effects in tissues following E2 administration in a timescale that is considered too fast for a genomic action. It is still unclear if receptors responsible for the rapid actions of estrogen are the same nuclear ERs or distinct G-protein coupled steroid receptors (Warner, et al., *Steroids* 2006 71:91-95) but an increasing number of E2 induced pathways have been identified e.g. MAPK/ERK pathway and activation of endothelial nitric oxide synthase and PI3K/Akt pathway. In addition to ligand dependent pathways, ERα has been shown to have ligand independent activity through AF-1 which has been associated with stimulation of MAPK through growth factor signalling e.g. insulin like growth factor 1 (IGF-1) and epidermal growth factor (EGF). Activity of AF-1 is dependent on phosphorylation of Ser118 and an example of cross-talk between ER and growth factor signalling is the phosphorylation of Ser 118 by MAPK in response to growth factors such as IGF-1 and EGF (Kato, et al., *Science,* 1995, 270:1491-1494).

A large number of structurally distinct compounds have been shown to bind to ER. Some compounds such as endogenous ligand E2, act as receptor agonists whereas others competitively inhibit E2 binding and act as receptor antagonists. These compounds can be divided into 2 classes depending on their functional effects. Selective estrogen receptor modulators (SERMs) such as tamoxifen have the ability to act as both receptor agonists and antagonists depending on the cellular and promoter context as well as the ER isoform targeted. For example, tamoxifen acts as an antagonist in breast but acts as a partial agonist in bone, the cardiovascular system and uterus. All SERMs appear to act as AF2 antagonists and derive their partial agonist characteristics through AF1. A second group, fulvestrant being an example, are classified as full antagonists and are capable of blocking estrogen activity via the complete inhibition of AF1 and AF2 domains through induction of a unique conformation change in the ligand binding domain (LBD) on compound binding which results in complete abrogation of the interaction between helix 12 and the remainder of the LBD, blocking co-factor recruitment (Wakeling, et al., *Cancer Res.*, 1991, 51:3867-3873; Pike, et al., *Structure*, 2001, 9:145-153).

Intracellular levels of ERα are down-regulated in the presence of E2 through the ubiquitin/proteasome (Ub/26S) pathway. Polyubiquitinylation of liganded ERα is catalysed by at least three enzymes; the ubiquitin-activating enzyme E1 activated ubiquitin is conjugated by E2 with lysine residues through an isopeptide bond by E3 ubiquitin ligase and polyubiquitinated ERα is then directed to the proteasome for degradation. Although ER-dependent transcription regulation and proteasome-mediated degradation of ER are linked (Lonard, et al., *Mol. Cell,* 2000 5:939-948), transcription in itself is not required for ERα degradation and assembly of the transcription initiation complex is sufficient to target ERα for nuclear proteasomal degradation. This E2 induced degradation process is believed to necessary for its ability to rapidly activate transcription in response to requirements for cell proliferation, differentiation and metabolism (Stenoien, et al., *Mol. Cell Biol.,* 2001, 21:4404-4412). Fulvestrant is also classified as a SERD, a subset of antagonists that can also induce rapid down-regulation of ERα via the 26S proteasomal pathway. In contrast a SERM such as tamoxifen can increase ERα levels although the effect on transcription is similar to that seen for a SERD.

Approximately 70% of breast cancers express ER and/or progesterone receptors implying the hormone dependence of these tumour cells for growth. Other cancers such as ovarian and endometrial are also thought to be dependent on ERα signalling for growth. Therapies for such patients can inhibit ER signalling either by antagonising ligand binding to ER e.g. tamoxifen which is used to treat early and advanced ER positive breast cancer in both pre- and post-menopausal setting; antagonising and down-regulating ERα e.g. fulvestrant which is used to treat breast cancer in women which have progressed despite therapy with tamoxifen or aromatase inhibitors; or blocking estrogen synthesis e.g. aromatase inhibitors which are used to treat early and advanced ER positive breast cancer. Although these therapies have had an enormously positive impact on breast cancer treatment, a considerable number of patients whose tumours express ER display de novo resistance to existing ER therapies or develop resistance to these therapies over time. Several distinct mechanisms have been described to explain resistance to first-time tamoxifen therapy which mainly involve the switch from tamoxifen acting as an antagonist to an agonist, either through the lower affinity of certain co-factors binding to the tamoxifen-ERα complex being off-set by over-expression of these co-factors, or through the formation of secondary sites that facilitate the interaction of the tamoxifen-ERα complex with co-factors that normally do not bind to the complex. Resistance could therefore arise as a result of the outgrowth of cells expressing specific co-factors that drive the tamoxifen-ERα activity. There is also the possibility that other growth factor signalling pathways directly activate the ER receptor or co-activators to drive cell proliferation independently of ligand signalling.

More recently, mutations in ESR1 have been identified as a possible resistance mechanism in metastatic ER-positive patient derived tumour samples and patient-derived xenograft models (PDX) at frequencies varying from 17-25%. These mutations are predominantly, but not exclusively, in the ligand-binding domain leading to mutated functional proteins; examples of the amino acid changes include Ser463Pro, Val543Glu, Leu536Arg, Tyr537Ser, Tyr537Asn and Asp538Gly, with changes at amino acid 537 and 538 constituting the majority of the changes currently described. These mutations have been undetected previously in the genomes from primary breast samples characterised in the Cancer Genome Atlas database. Of 390 primary breast cancer samples positive for ER expression not a single mutation was detected in ESR1 (Cancer Genome Atlas Network, 2012 *Nature* 490: 61-70). The ligand binding domain mutations are thought to have developed as a resistance response to aromatase inhibitor endocrine therapies as these mutant receptors show basal transcriptional activity in the absence of estradiol. The crystal structure of ER, mutated at amino acids 537 and 538, showed that both mutants favoured the agonist conformation of ER by shifting the position of helix 12 to allow co-activator recruitment and thereby mimicking agonist activated wild type ER. Published data has shown that endocrine therapies such as tamoxifen and fulvestrant can still bind to ER mutant and inhibit transcriptional activation to some extent and that fulvestrant is capable of degrading Try537Ser but that higher doses may be needed for full receptor inhibition (Toy et al., *Nat. Genetics* 2013, 45: 1439-1445; Robinson et al., *Nat. Genetics* 2013, 45: 144601451; Li, S. et al. *Cell Rep.* 4, 1116-1130 (2013). It is therefore feasible that Compound (I) or pharmaceutically acceptable salts thereof will be capable of down-regulating and antagonising mutant ER although it is not known at this stage whether ESR1 mutations are associated with an altered clinical outcome.

Regardless of which resistance mechanism or combination of mechanisms takes place, many are still reliant on ER-dependent activities and removal of the receptor through a SERD mechanism offers the best way of removing the ERα receptor from the cell. Fulvestrant is currently the only SERD approved for clinical use, yet despite its mechanistic properties, the pharmacological properties of the drug have limited its efficacy due to the current limitation of a 500 mg monthly dose which results in less than 50% turnover of the receptor in patient samples compared to the complete down-regulation of the receptor seen in in vitro breast cancer cell line experiments (Wardell, et al., *Biochem. Pharm.,* 2011, 82:122-130).

N-(1-(3-fluoropropyl)azetidin-3-yl)-6-((6S,8R)-8-methyl-7-(2,2,2-trifluoroethyl)-6,7,8,9-tetrahydro-3H-pyrazolo[4,3-f]isoquinolin-6-yl)pyridin-3-amine (Compound (I), AZD9833) was recently identified as a SERD compound with promising in vitro and in vivo activity (WO2018/077630A1). This compound is currently undergoing evaluation in clinical trials. It is an object of the present specification to provide pharmaceutical formulations of this compound with the appropriate physicochemical and pharmaceutical properties allowing for effective clinical use.

SUMMARY

In a first aspect the present specification provides a pharmaceutical formulation comprising N-(1-(3-fluoropropyl)azetidin-3-yl)-6-((6S,8R)-8-methyl-7-(2,2,2-trifluoroethyl)-6,7,8,9-tetrahydro-3H-pyrazolo[4,3-f]isoquinolin-6-yl)pyridin-3-amine, microcrystalline cellulose (MCC) and dicalcium phosphate anhydrous (DCPA). The pharmaceutical formulations according to the specification may comprise further excipients, for example disintegrants or lubricants.

In a further aspect the specification provides an oral solid dosage form, for example a tablet, comprising N-(1-(3-fluoropropyl)azetidin-3-yl)-6-((6S,8R)-8-methyl-7-(2,2,2-trifluoroethyl)-6,7,8,9-tetrahydro-3H-pyrazolo[4,3-f]isoquinolin-6-yl)pyridin-3-amine, microcrystalline cellulose (MCC) and dicalcium phosphate anhydrous (DCPA). The oral solid dosage forms according to this aspect may comprise further excipients, for example disintegrants or lubricants and may be provided as a coated tablet.

In a further aspect the specification provides a method for producing a solid oral dosage form according to the specification comprising the steps of i) dry granulating N-(1-(3-fluoropropyl)azetidin-3-yl)-6-((6S,8R)-8-methyl-7-(2,2,2-trifluoroethyl)-6,7,8,9-tetrahydro-3H-pyrazolo[4,3-f]isoquinolin-6-yl)pyridin-3-amine, microcrystalline cellulose (MCC) and dicalcium phosphate anhydrous (DCPA); and ii) compressing the resulting blend into a tablet.

FIGURES

So that the specification may be fully understood reference is made to the following Figures.

FIG. 1: Flow function coefficient (FFC) of the prototype formulation blends A to D.

Figure 2:
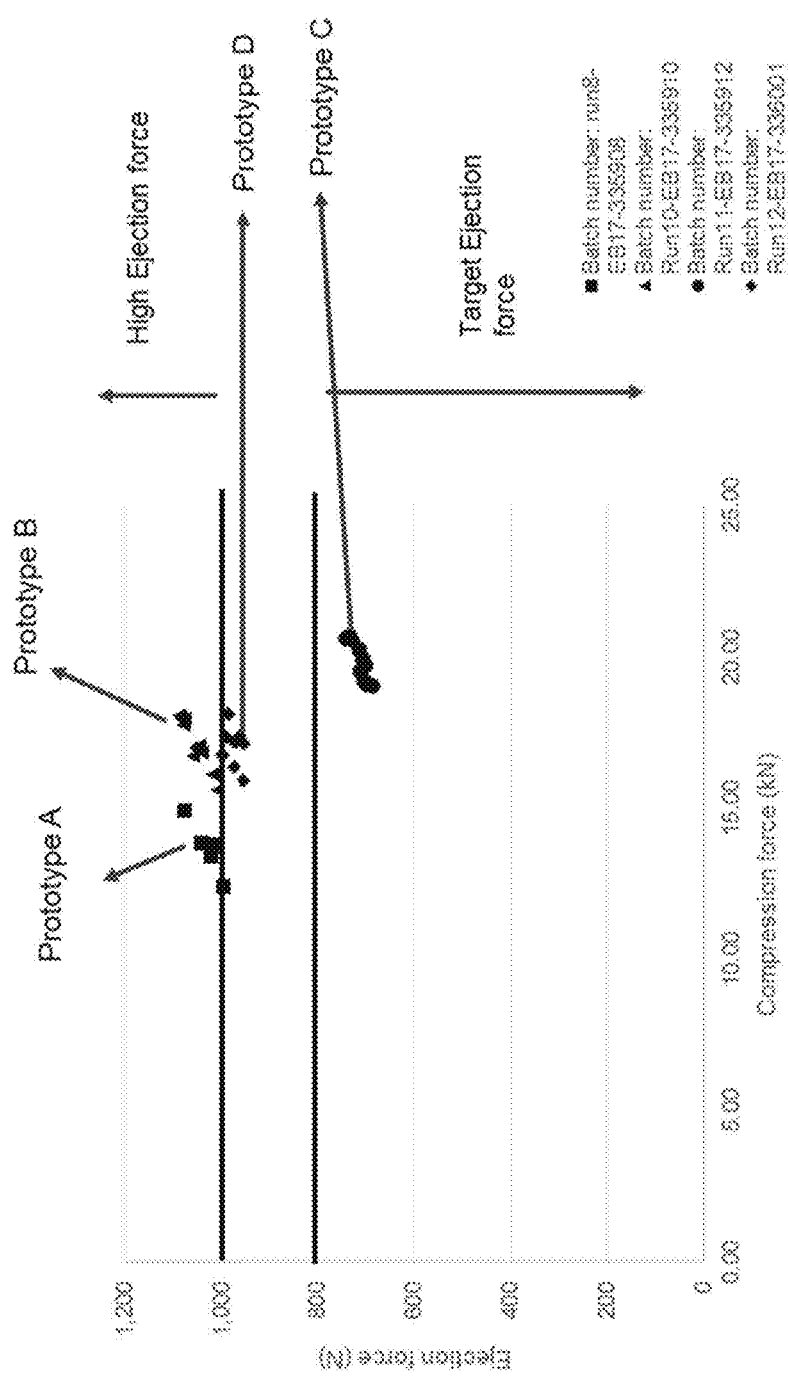

FIG. 2: Ejection force data for tablets manufactured from prototype formulation blends A to D as measured on the STYL'One press.

Figure 3:
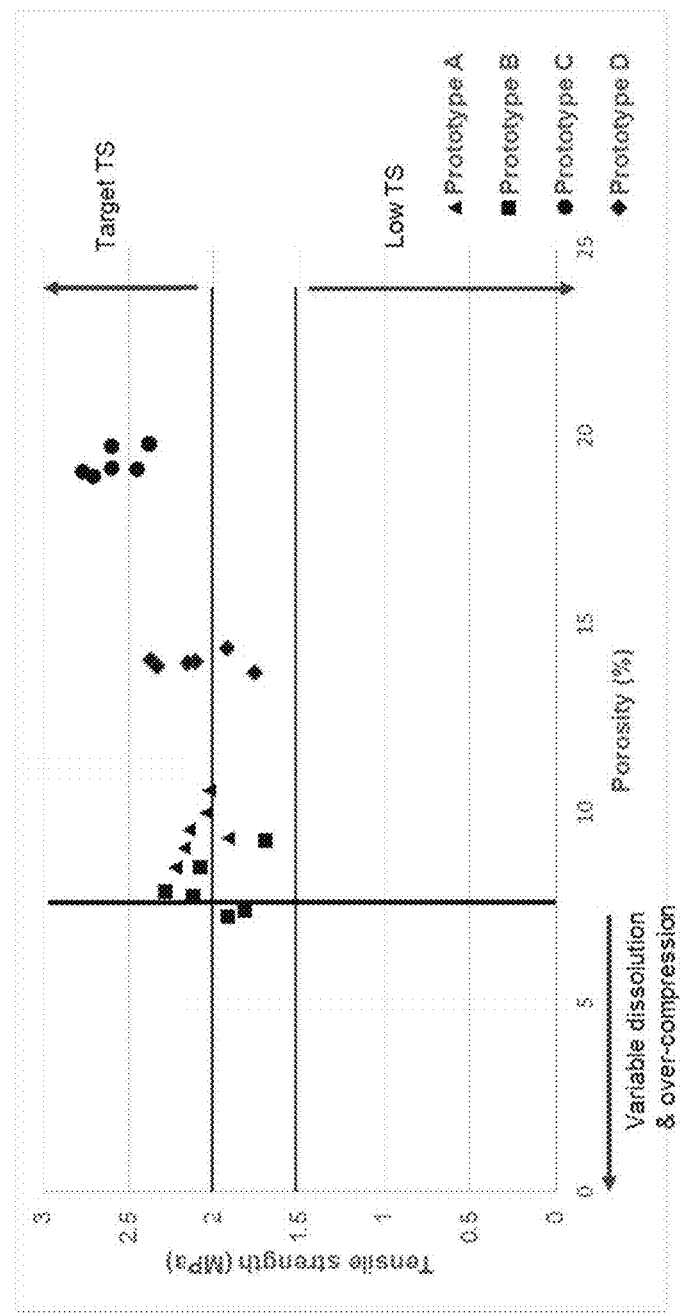

FIG. 3: Tensile strength and porosity data of tablet made from formulation blends A to D using a STYL'One press simulating Korsch XL 200 at 50 rpm.

Figure 4:
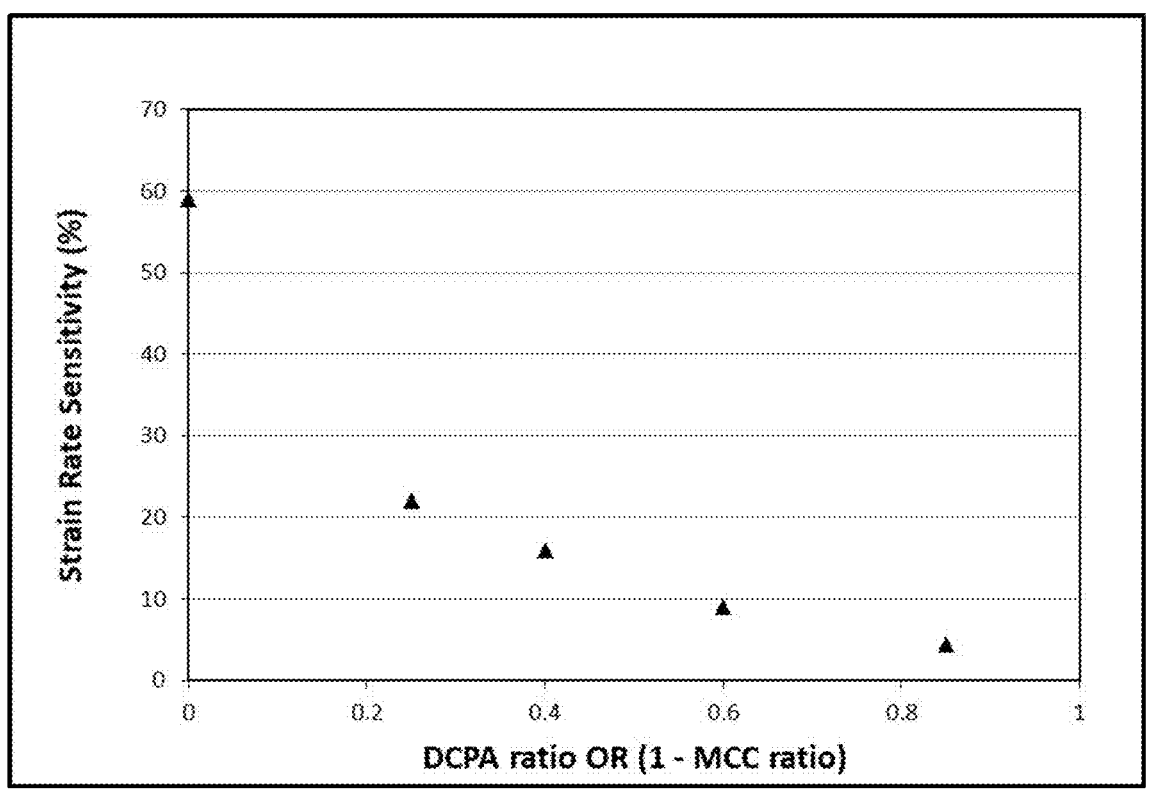

FIG. 4: Strain rate sensitivity plot for formulations blends E, F, C, G and H.

Figure 5:
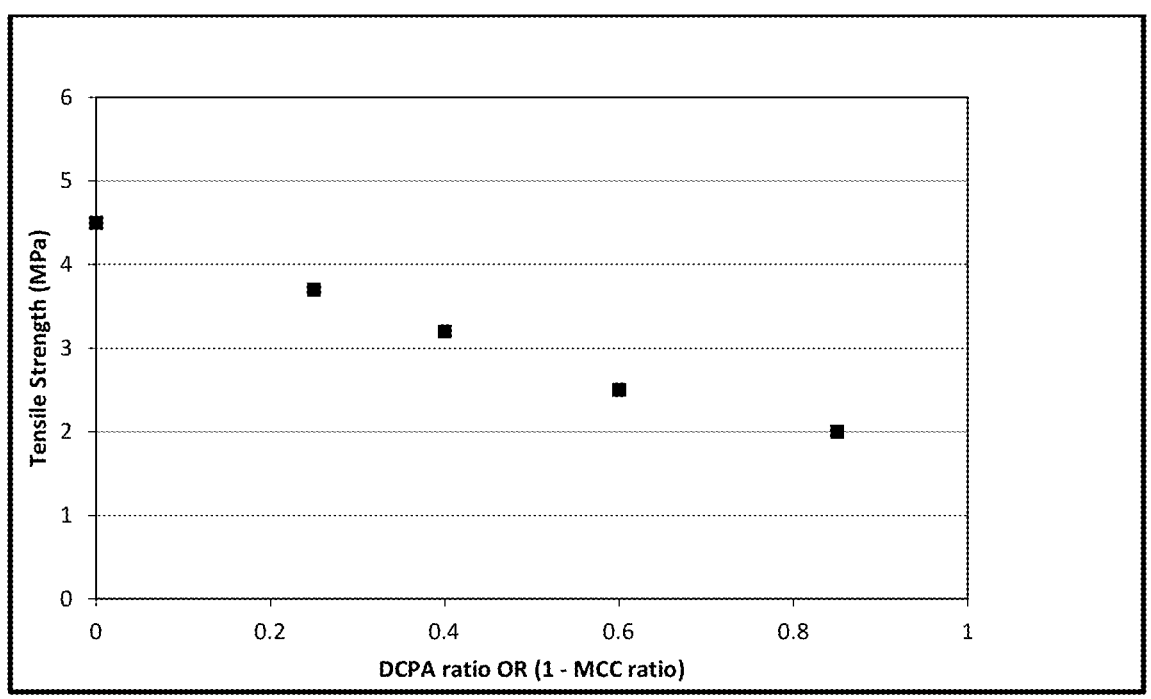

FIG. 5: Tensile strength for formulations E, F, C, G and H.

Figure 6:
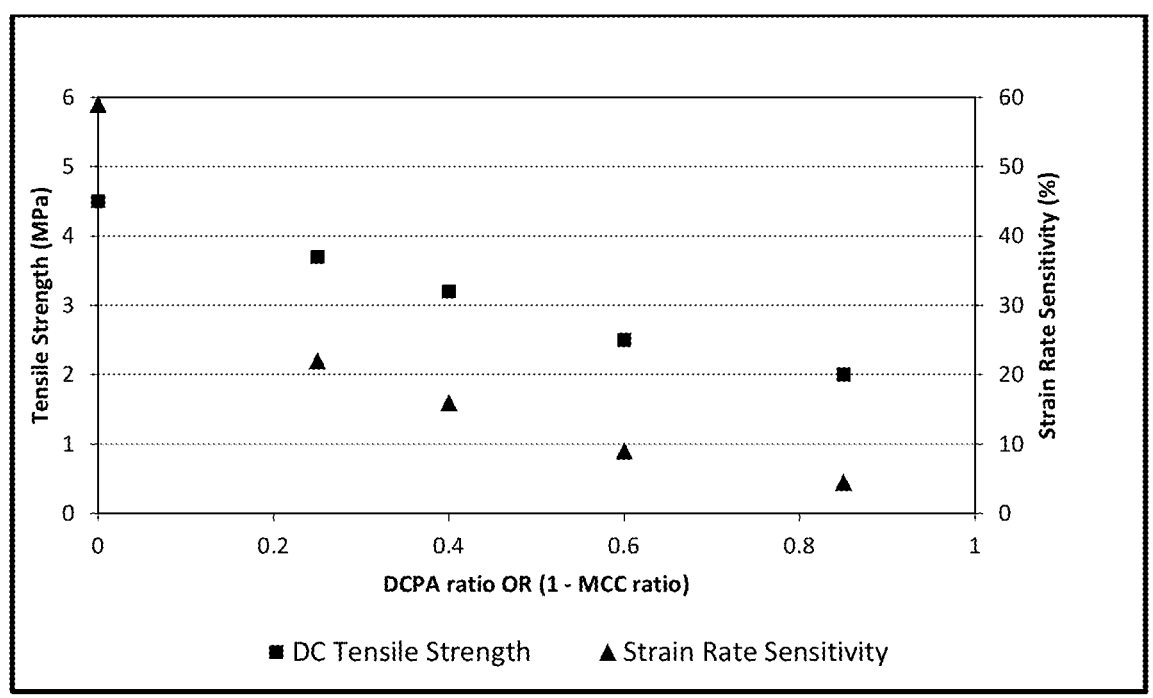

FIG. 6: Combined plot showing strain rate sensitivity of formulations blends E, F, C, G and H and tensile strength of tablets produced from these blends.

Figure 7A:
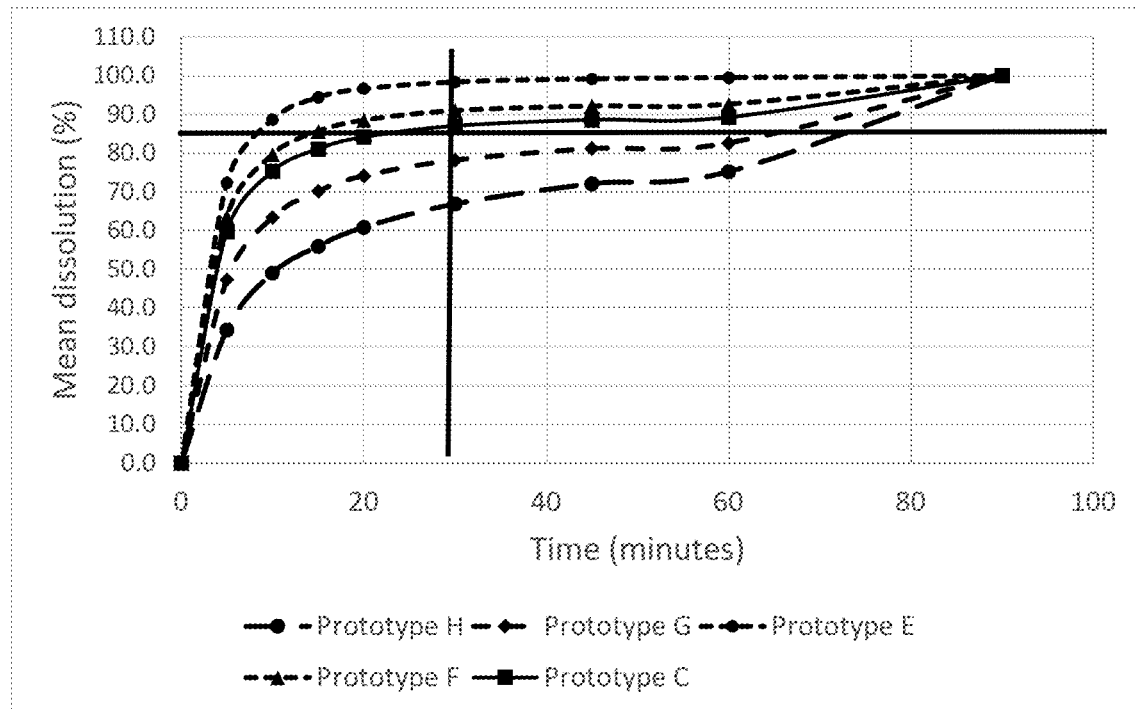

FIG. 7a: Dissolution of tablet formulations E, F, C, G and H in the USP2 apparatus in SGF.

Figure 7B:
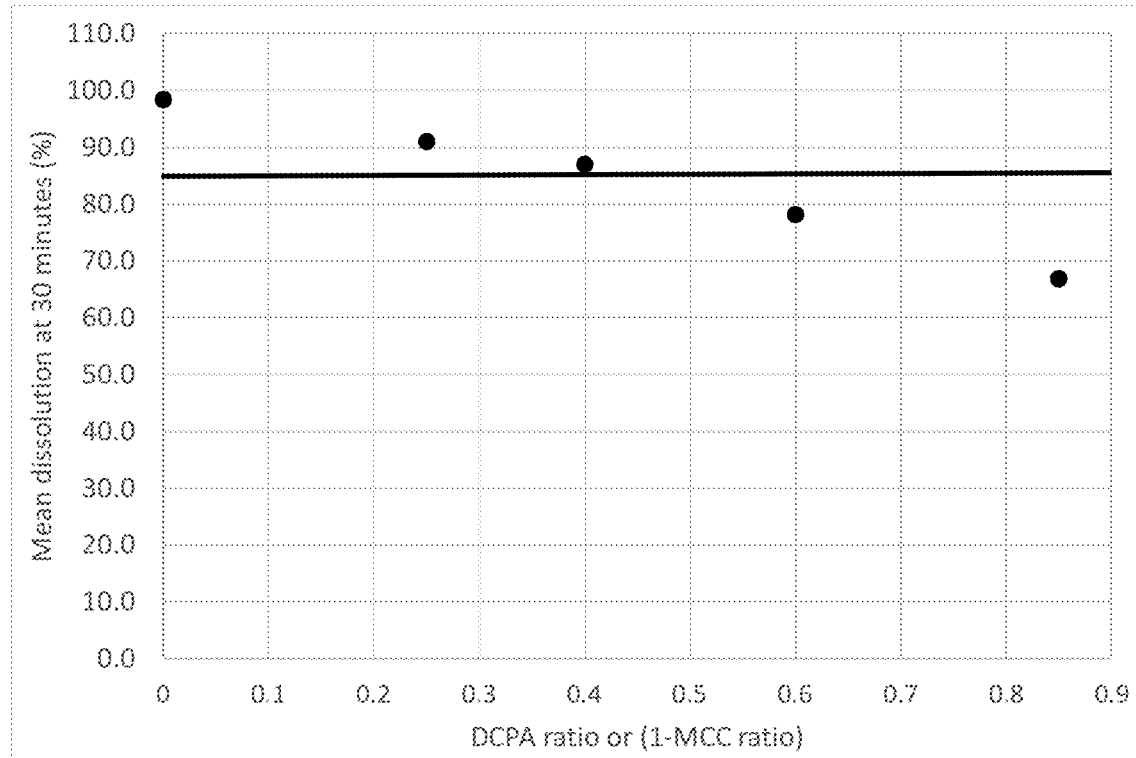

FIG. 7b: Plot illustrating the mean dissolution at 30 minutes in the USP2 apparatus in SGF as a function of the ratio of MCC to DCPA.

Figure 8:
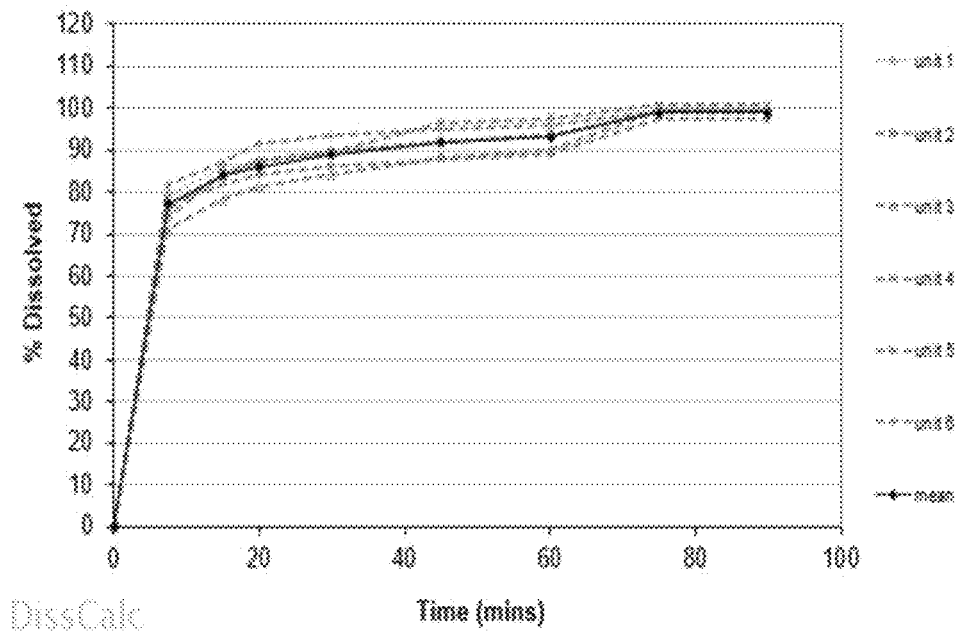
Figure 8:
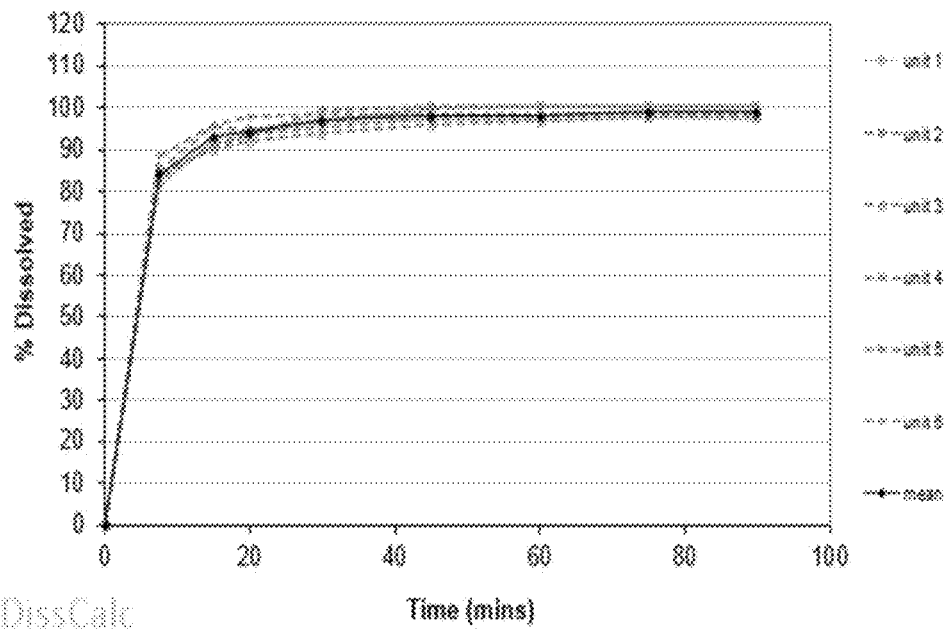

FIG. 8: Dissolution of 20 and 100 mg coated tablets in SGF using USP2 apparatus at 50 rpm.

DETAILED DESCRIPTION

As noted above, the present specification provides a pharmaceutical formulation, for example a tablet, comprising N-(1-(3-fluoropropyl)azetidin-3-yl)-6-((6S,8R)-8-methyl-7-(2,2,2-trifluoroethyl)-6,7,8,9-tetrahydro-3H-pyrazolo[4,3-f]isoquinolin-6-yl)pyridin-3-amine, microcrystalline cellulose (MCC) and dicalcium phosphate anhydrous (DCPA).

The formulations according to the specification possess various advantageous properties that render them useful in the field of pharmaceuticals. For example, the good flow properties of the blend of Compound (I) and the specified excipients allow for efficient processing for the manufacture of oral solid dosage forms, for example via dry granulation. The product oral dosage forms, for example tablets formed from the formulations according to the specification, possess good stability, immediate release properties and exhibit excellent structural integrity. Thus immediate release tablets containing Compound (I) with good tensile strength and stability can be efficiently manufactured.

N-(1-(3-fluoropropyl)azetidin-3-yl)-6-((6S,8R)-8-methyl-7-(2,2,2-trifluoroethyl)-6,7,8,9-tetrahydro-3H-pyrazolo[4,3-f]isoquinolin-6-yl)pyridin-3-amine (Compound (I)) as produced by the methods described in WO2018/077630A1 is obtained as various polymorphic and solvated crystalline forms. The Compound (I) used in the formulations according to the specification is generally present in crystalline Form A as described in WO2018/077630A1, accordingly reference to stability of the formulations of the specification herein and above refers both to the stability of the crystalline form of Compound (I), and, moreover, to the stability of Compound (I) to chemical degradation from processes such as oxidation, for example on storage. Both these factors, i.e. solid phase stability and chemical stability, can impact on the reproducibility of release, and uptake, of Compound (I) on administration to a patient in need. These factors are therefore key requisites in delivering an effective formulation with reproducible release properties and an acceptable shelf life.

In embodiments the specification provides a pharmaceutical formulation comprising Compound (I), or a pharmaceutically acceptable salt thereof, microcrystalline cellulose and dicalcium phosphate. The pharmaceutical formulation is preferably in the form of a tablet. The pharmaceutical formulation is preferably an immediate release formulation, for example a tablet with immediate release properties, optionally a coated tablet. In embodiments the immediate release pharmaceutical formulation is in the form of a coated tablet.

In preferred embodiments of the specification the ratio of MCC to DCPA in the formulation is from 3:1 MCC to DCPA to 2:3 MCC to DCPA. This specific range of ratios of MCC to DCPA is the range in which the formulations a) exhibit a strain rate sensitivity (SRS) below around 20% that allows high speed processing, for example high speed processing by dry granulation, and b) that can be processed to deliver tablets with, among other advantages, consistently high tensile strengths (>2 MPa). Tablet formation can be achieved by various methods including direct compaction and roller compaction. The properties of the formulations according to the specification render them amenable to manufacturing of tablets through a continuous direct compression process in which the blending and compression steps are combined in a single, continuous process. This rapid processability simplifies and accelerates manufacturing, while the high tensile strength provides good tablet integrity and reduced failure rates. Low SRS and high tensile strength of the blend of excipient and Compound (I) both contribute to a reduced cost of goods.

In a further preferred embodiments the ratio of MCC to DCPA is from 3:1 to 3:2, these particular ratios are advantageous in that the lower amount of the relatively dense DCPA excipient reduces the extent of coning in, for example dissolution testing, that can impair the generation of uniform in vitro release of Compound (I), for example in quality control of manufactured tablet batches.

DCPA, known also as dicalcium phosphate anhydrous or anhydrous calcium hydrogen phosphate, is commercially available from a range of suppliers. Suitable free flowing grades of DCPA for use in the pharmaceutical formulations according to the specification include EMCOMPRESS® from JRS Pharma (www.jrspharma.com) and A-TAB from Innophos (www.innophos.com).

MCC, microcrystalline cellulose, is commercially available from a range of suppliers. Suitable free flowing and high density grades of MCC for use in the pharmaceutical formulations according to the specification include Avicel® pH 102, Avicel® pH 101, Avicel® pH 200 (all from Dupont Pharma, www.dupont.co.uk), VIVAPUR® 102 and VIVAPUR® 200 (from JRS PHARMA GmbH & Co. KG, Rosenberg, Germany).

The formulations according to the specification may, in addition to MCC and DCPA, comprise up to 25% w/w of a further filler selected from mannitol, lactose, silicified microcrystalline cellulose, polydextrose, trehalose, sucrose, glucose, cyclodextrin.

In embodiments the total amount of the MCC and DCPA in the pharmaceutical formulations according to the specification is up to 85% w/w, for example 65.5%. Typically, the combined amount of MCC and DCPA in the formulation according to the specification is 15% w/w to 85% w/w, for example from 40% to 85% w/w.

In embodiments the amount of Compound (I) in the formulations according to the specification is up to 60% w/w. In embodiments the amount of Compound (I) is up to 40% w/w, for example 27% w/w.

In embodiments the total amount of MCC and DCPA is from 15% to 85% and the amount of Compound (I) is from 10% to 60% (all % w/w).

In embodiments Compound (I) is present as the free base. In embodiments the Compound (I) is present as a pharmaceutically acceptable salt form.

In embodiments the pharmaceutical formulations according to the specification comprise Compound (I) free base in crystalline form. In embodiments Compound (I) is present as the crystalline free base in polymorph Form A as described in WO2018/077630A1.

In embodiments the pharmaceutical formulations according to the specification further comprise a disintegrant selected from croscarmellose sodium, crospovidine, sodium starch glycolate, low substituted hydroxypropyl cellulose (L-HPC) and pregelatinized starch 1500. In embodiments the pharmaceutical formulations according to the specification comprise sodium starch glycolate. Suitable commercial grades of sodium starch glycolate for use in formulations according to the specification include Glycolys® LV (www.roquette.com) and Primojel® (www.dfepharma.com). In embodiments where the pharmaceutical formulations according to the specification comprise a disintegrant, for example sodium starch glycolate, the disintegrant is present in an amount of up to 30% w/w, although a lower amount such as 10% or 5% is generally used, or optionally up to 5% w/w, for example 1%, 2%, 3%, 4% or 5% (all % w/w).

In embodiments the pharmaceutical formulations according to the specification further comprise a lubricant selected from magnesium stearate, calcium stearate, sodium stearyl fumarate (SSF), glyceryl behenate and stearic acid. In embodiments the lubricant is magnesium stearate. In embodiments where the pharmaceutical formulations according to the specification comprise a lubricant, for example magnesium stearate, the lubricant is present in an amount of up to 4% w/w, optionally up to 2.5% w/w, for example 0.5%, 1%. 1.5%, 2% or 2.5% (all w/w). Magnesium stearate 1.5% w/w is a suitable amount and type of lubricant in the pharmaceutical formulations according to the specification. Suitable commercial grades of magnesium stearate for use in the pharmaceutical formulations according to the specification include LIGAMED® MF from Peter Greven (Peter Greven GmbH & Co. KG, www.peter-greven.de). Use of a lubricant in the pharmaceutical formulations according to the specification helps ensure that the production of tablets is efficient and is associated with advantageously low ejection forces from tableting presses and minimisation of flaws in the product tablets.

Pharmaceutical formulations according to the specification may comprise further excipients depending on the precise formulation properties required. Such additional excipients may be selected from, for example, mannitol, lactose, dicalcium phosphate, calcium sulfate dihydrate, tribasic calcium phosphate, dibasic calcium phosphates dihydrate, dibasic calcium phosphates anhydrous, silicified microcrystalline cellulose, their co-processed combinations, polydextrose, trehalose, sucrose, glucose, cyclodextrin, hydroxypropylcellulose (such as Klucel™, www.ashland.com) and polyvinylpyrrolidone (povidone K30, www.sigmaaldrich.com). Notwithstanding this, further excipients are not generally required to deliver the advantageous combination of low SRS in the blend and high tensile in the product tablets as is evident from the data presented herein.

In an embodiment there is provided a tablet comprising Compound (I), MCC, DCPA, sodium starch glycolate and magnesium stearate wherein the ratio of MCC to DCPA is from 3:1 MCC to DCPA to 2:3 MCC to DCPA. In an embodiment there is provided an immediate release tablet comprising Compound (I), MCC, DCPA, a disintegrant such as sodium starch glycolate and a lubricant such as magnesium stearate wherein the ratio of MCC to DCPA is from 3:1 MCC to DCPA to 2:3 MCC to DCPA. In an embodiment there is provided an immediate release tablet comprising crystalline Compound (I), MCC, DCPA, a disintegrant such as sodium starch glycolate and a lubricant such as magnesium stearate wherein the ratio of MCC to DCPA is from 3:1 MCC to DCPA to 2:3 MCC to DCPA. In embodiments the immediate release tablets are coated tablets.

In an embodiment there is provided an immediate release tablet comprising up to 40% w/w Compound (I), MCC, DCPA, a disintegrant such as sodium starch glycolate in an amount of up to 5% w/w and a lubricant such as magnesium stearate in an amount of up to 1.5% w/w and wherein the ratio of MCC to DCPA is from 3:1 MCC to DCPA to 2:3 MCC to DCPA. In embodiments the immediate release tablets are coated tablets.

In an embodiment there is provided an immediate release tablet comprising Compound (I), MCC, DCPA, a disintegrant such as sodium starch glycolate in an amount of up to 5% w/w and a lubricant such as magnesium stearate in an amount of up to 1.5% w/w and wherein the ratio of MCC to DCPA is from 3:1 MCC to DCPA to 2:3 MCC to DCPA. In an embodiment there is provided an immediate release tablet comprising crystalline Compound (I), MCC, DCPA, sodium starch glycolate in an amount of up to 5% w/w and magnesium stearate in an amount of up to 1.5% w/w and wherein the ratio of MCC to DCPA is from 3:1 MCC to DCPA to 2:3 MCC to DCPA. In embodiments the immediate release tablets are coated tablets. In embodiments the immediate release tablets are coated tablets.

In an embodiment there is provided an immediate release tablet comprising 27% w/w Compound (I), 39.9% w/w MCC, 26.6% w/w DCPA, 5.0% w/w sodium starch glycolate and 1.5% w/w magnesium stearate. In embodiments the immediate release tablets are coated tablets.

As noted above the tablets may be coated with a standard pharmaceutically acceptable coating. The coating may be selected from the standard coatings known in the art, for example a commercially available coating system such as Opadry® II (www.colorcon.com) that contains a polymer, plasticizer and pigment and that allows for immediate release. Coating can advantageously further increase the shelf life of the tablets as the coating can protect tablets from light, moisture and oxidation. Coatings may also be used to improve the aesthetics of the tablet, as well as improving tablet mechanical strength and to mask odours or taste.

Polymers used in the coating layer can be chosen, for example, from a cellulosic polymer such as hydroxypropyl methyl cellulose (HPMC) as found in Opadry® I (www.colorcon.com) and the Aquarius coating systems (www.ashland.com), hydroxypropyl cellulose (HPC) and ethyl cellulose (EC) or vinyls such as polyvinyl alcohol. Plasticizing agents are used to improve elasticity of the coating film and reduce the film forming temperature of the polymer thus allowing lower temperature processing. Suitable plasticizing agents include propylene glycol or polyethylene glycol or glycerol, acetate esters such as triacetin (glycerol triacetate) or triethyl citrate (TEC), glycerides such as acetylated monoglycerides, and mineral and vegetable oils. Colourants and pigments are used to increase the opacity and/or light protection of the film and provide colouration. Suitable colourants include indigo carmine, tartrazine, allura red, and quinoline yellow; inorganic pigments such as titanium dioxide, iron oxides, and pearlescent pigments and natural pigments such as vegetable juice, carotenoids, and turmeric.

The coating may also incorporate further functional ingredients such as glidants, flavours and viscosity modifiers all of which are well known in the art. General details on pharmaceutical coatings can be found in Aulton's Pharmaceutics, 5$^{th}$ Edition, 2018, Elsevier, at e.g. page 580-596.

Opadry® II is one example of a coating system that can be used to film coat tablets according to the specification. The precise composition of Opadry® II will vary on the colour selected with pigments such as iron oxide being added to give the desired colouration. In Opadry® II Beige (85F270011) for example 98.8% by weight of the coating is made up of polyvinyl alcohol, titanium dioxide polyethylene glycol 3350, and talc (in amounts of 40, 23.8, 20.2 and 14.8 (all % w/w), respectively with the remainder being yellow, red and black iron oxide).

Aquarius coating systems may equally be used, example of the suitable compositions for such coatings are provided below. The Aquarius Preferred HSP coating is a high-solids coatings based on copovidone with cellulosic polymers having the composition shown below.

| Component | Aquarius Preferred % w/w | Aquarius Preferred HSP % w/w |
|---|---|---|
| HPMC 6 cp | 25.000 | 33.500 |
| Plasdone S-630 | 22.500 | 27.500 |
| Polydextrose-Non GMO | 15.000 | — |
| PEG 3350 | 9.500 | 9.500 |
| Miglyol | 3.000 | 3.000 |
| Titanium dioxide | 22.080 | 23.580 |
| Yellow iron oxide | 2.340 | 2.340 |
| Red iron oxide | 0.410 | 0.410 |
| Black iron oxide | 0.170 | 0.170 |

In an embodiment there is provided a process for preparing tablets comprising a pharmaceutical formulation comprising Compound (I), MCC and DCPA comprising the step of: i) blending Compound (I), or a pharmaceutically acceptable salt thereof, with MCC and DCPA and optionally further excipients, for example by dry granulation, to form a blend; and ii) compressing the blend, for example by roller compaction, to deliver tablets.

A typical tableting process commences introducing, in batches or continuously, a bulk powder mix or granules into a feeder frame that fills a tabletting die with a predetermined weight of material in a consistent manner. The contents of the filled tabletting die are then compressed, typically by the action of the upper and lower punches to form a compacted formulation that is then ejected to form intact tablets.

Tablets prepared from the pharmaceutical formulations according to the specification have advantageously high tensile strength and consequently exhibit good mechanical stability. The formulations according to the specification comprise a blend of the active pharmaceutical ingredient (API), Compound (I), with MCC and DCPA that displays good strain rate sensitivity (SRS), of ca 20% or less, and this low strain rate sensitivity allows for rapid blending of the API and the excipients in the production of tablets containing high w/w amounts of Compound (I). The formulations according to the specification deliver tablets that can be reproducibly manufactured without over-compression that have a porosity value commensurate with reproducible dissolution profile.

Tablets according to the specification are those prepared from the formulations according to the specification via standard techniques such as roller compaction or direct compaction. The tablets according to the specification comprise Compound (I) in an amount suitable for dosing to a patient in need thereof, as a single tablet or as a plurality of tablets. The dose of Compound (I) required in the compositions of the specification for the therapeutic or prophylactic treatment of a particular disease or medical condition will necessarily be varied depending on, for example, the host treated and the severity of the illness being treated. The amount of the active compound administered will be dependent on the subject being treated, the severity of the disorder or condition, the rate of administration, the disposition of the compound and the discretion of the prescribing physician. The amount of Compound (I) in an individual tablet, i.e. the unit dose, is generally in the range of from 5 mg to 250 mg, for example 5, 10, 20, 25, 50, 75, 100, 150 or 250 mg. In embodiments, tablet according to the specification contain 25 mg, 50 mg or 100 mg of Compound (I). In embodiments, tablet according to the specification contain 75 mg of Compound (I). In embodiments, the w/w % of Compound (I) in the tablets according to the specification is up to 40%, for example 20%, 25%, 27%, 30%, 35% or 35%. In embodiments, the w/w % of Compound (I) in the tablets according to the specification is 27%.

As used herein and unless stated otherwise, it is to be understood that the term ca is used synonymously with the term "approximately". Illustratively and unless stated otherwise, the use of the term ca indicates values slightly outside the cited criteria values, namely, ±10% (conveniently ±5%, such as ±2%).

Notably the formulations according to the specification display immediate release properties. As used herein, the term "immediate release" or "IR" is used in its conventional sense to refer to a dosage form that provides for release of Compound (I) immediately after administration. For example, an immediate release pharmaceutical composition means a composition in which the dissolution rate of the drug from the composition is 80% or more after 30 minutes from the beginning a dissolution test, which is carried out in accordance with a dissolution test (paddle method) described in the United States Pharmacopoeia under the conditions that 900 mL of an appropriate test fluid (such as a USP buffer, pH 6.8 or pH 7.4) is used and the paddle rotation speed is 50, 75 or 100 rpm (for example as in the United States Pharmacopoeia Apparatus II (paddle) as described in the Examples below (wherein the dissolution test is performed with a USP 2 apparatus at 75 rpm in pH 6.8 phosphate buffer).

An iterative design process delivered prototype formulations comprising a MCC/DCPA filler blend that was selected in preference to a range of alternative filler blends such as MCC/mannitol systems. The Compound (I)/MCC/DCPA blends were found to display a range of desirable properties. As a first example, these Compound (I)/MCC/DCPA blends were observed to have significantly higher flow function coefficients (FFC) than the alternative blends evaluated, an advantage as a higher FFC indicates a lower propensity for granulation problems arising that could impair processing into tablets via roller compaction, or, eventually, continuous direct compression (FIG. 1, entry C). As a second example, further profiling of the prototype blends revealed that tablets produced from the Compound (I)/MCC/DCPA blends were superior in terms of tensile strength and porosity (FIG. 3, entries C & D) with a porosity of >9% being targeted to avoid the risk of variable dissolution and over compression. The Compound (I)/MCC/DCPA prototype blend also consistently delivered tablets with a tensile strength >2 MPa (see below for details of techniques for measuring this). In addition to the properties, the prototype Compound (I)/MCC/DCPA blends also proved to have advantageously low ejection forces than the equivalent Compound (I)/mannitol/MCC blend, with ejection forces for the tablets with the respective excipients of <800N and >1000N, respectively (see FIG. 3, entry C). A lower ejection force is desirable as this is indicative of a lower propensity of the tablet to stick to the tablet punch and a lower propensity for defective tablets being generated in production.

Having established the advantageous properties of the Compound (I)/MCC/DCPA prototype formulations, experiments were performed to establish the ratios of MCC/DCPA that would deliver the target blend strain rate sensitivity (SRS) of up to ca 20% and tablet tensile strength of >2 MPa. Optimal ratios of MCC and DCPA in the formulations according to the specification range from 3:1 MCC to DCPA to 2:3 MCC to DCPA were thus established (see FIG. 6).

Formulations with ratios of MCC to DCPA within the preferred range of from 3:1 MCC to DCPA to 2:3 MCC to DCPA could be used to deliver tablets with a high loading of Compound (I), up to 60% that had the desired combination of blend SRS and tablet tensile strength.

Within the range of MCC to DCPA blend ratios described above that deliver the desired blend SRS and tablet tensile strength, it has also proven advantageous to work in the range of from 3:1 MCC to DCPA to 3:2 MCC to DCPA as, by reducing the amount of the relatively dense DCPA excipient, blends with such ratios are less prone to coning of material when the formulation is exposed to bio-relevant dissolution media, a phenomena that can impair release in in vitro studies performed for quality testing purposes, albeit this should not impair release in vivo.

The precise total w/w % amount of MCC and DCPA used in the formulation, in contrast to the relative ratios of these two fillers, can vary as a function of how much active ingredient, Compound (I), is present and what other excipients may be present in the formulation. The amount of each particular component (active ingredient or excipient) of the formulations according to the specification are expressed as percentage values, this refers to the w/w % i.e. as the weight of component divided by the total weight of all components multiplied by 100 to give a percentage. The w/w % does not include any optional coating layer that may be used to coat a tablet formed from the formulation.

In a preferred embodiment the tablets according to the specification have the composition of Table 3 below wherein the film coating is optional.

Medical Uses

As noted above, Compound (I) is a potent estrogen receptor binder and reduces cellular levels of ERα and accordingly the compositions according to the present specification may be of value as anti-tumour agents, useful in the treatment of conditions such as those described in International Patent Application WO2018/077630A1, which discloses Compound (I). For example, the immediate release pharmaceutical compositions of the specification may be of value in delivering Compound (I) to patients wherein it may act as a selective inhibitor of the proliferation, survival, motility, dissemination and invasiveness of mammalian cancer cells leading to inhibition of tumour growth and survival and to inhibition of metastatic tumour growth. Particularly, the compositions of the specification may be of value as anti-proliferative and anti-invasive compositions in the containment and/or treatment of solid tumour disease, including, but not limited to, tumours which are sensitive to ERα and that are involved in the signal transduction steps which lead to the proliferation and survival of tumour cells and the migratory ability and invasiveness of metastasising tumour cells. Further, the compositions of the specification may be useful in the prevention or treatment of those tumours which are mediated alone or in part by antagonism and down-regulation of ERα, i.e., the compositions may be used to produce an ERα inhibitory effect in a warm blooded animal in need of such treatment. For example, the compositions of the specification may be useful for the prevention or treatment of cancer, including, but not limited to, estrogen sensitive diseases or conditions (including diseases that have developed resistance to endocrine therapies), for use in treatment of cancer of the breast (including ER+ve breast cancer) and gynaecological cancers (including endometrial, ovarian and cervical) and cancers expressing ERα mutated proteins which may be de novo mutations or have arisen as a result of treatment with a prior endocrine therapy such as an aromatase inhibitor, for example a non-steroidal aromatase inhibitor such as letrozole or anastrazole.

In one embodiment there is provided an immediate release pharmaceutical composition as hereinbefore defined for use in therapy.

A further aspect of the present specification provides an immediate release pharmaceutical composition according to the specification as hereinbefore defined for use as a medicament in a warm blooded animal such as man.

Compound (I) as present in the compositions of the specification provides an inhibitory effect on ERα. Accordingly, the compositions of the specification are expected to be useful in the treatment of diseases or medical conditions mediated alone or in part by ERα, i.e. the composition of the specification may be used to produce an ERα inhibitory effect in a warm blooded animal in need of such treatment. Thus the composition of the specification provides a method for treating cancers (including solid tumour diseases), including but not limited to estrogen sensitive diseases or conditions (including diseases that have developed resistance to endocrine therapies) characterised by inhibition of ERα, i.e. the composition of the specification may be used to produce an anti-proliferative effect and/or an anti-invasive effect by the containing and/or treatment of solid tumour disease alone or in part by the inhibition of ERα. Accordingly, the compositions of the specification are expected to be useful in the prevention or treatment of cancers in a warm blooded animal such as man, that are sensitive to inhibition of ERα, particularly in the treatment of solid tumour diseases such as the diseases hereinbefore described. In a particular embodiment, the composition of the specification provides a method for producing an anti-proliferative effect in a warm blooded animal, such as man, in need of such treatment which comprises administering to said animal an effective amount of the pharmaceutical formulation as defined hereinbefore. In yet a further particular embodiment, administration of a pharmaceutical formulation of the specification to a patient in need thereof provides a method for producing an anti-invasive effect by the containment and/or treatment of solid disease in a warm blooded animal, such as man. In yet a further particular embodiment, the specification provides a method for the prevention or treatment of cancer in a warm blooded animal, such as man, in need of such treatment which comprises administering to said animal an effective amount of a pharmaceutical formulation according to the specification as defined hereinbefore. In yet a further particular embodiment, the specification provides a method for the prevention or treatment of solid tumour disease in a warm blooded animal, such as man, in need of such treatment which comprises administering to said animal an effective amount of the pharmaceutical formulation according to the specification. In yet a further particular embodiment, the specification provides a method for the prevention or treatment of those tumours which are sensitive to inhibition of ERα that are involved in the signal transduction steps which lead to the proliferation, survival, invasiveness and migratory ability of tumour cells, in a warm blooded animal, such as man, in need of such treatment which comprises administering to said animal an effective amount of a pharmaceutical formulation according to the specification. In yet a further particular embodiment, the specification provides a method providing an inhibitory effect on ERα in a warm blooded animal, such as man, in need of such treatment which comprises administering to said animal an effective amount of pharmaceutical formulation according to the specification. In yet a further particular embodiment, the specification provides a method for providing a selective inhibitory effect on ERα in a warm blooded animal, such as man, in need of such treatment which comprises administering to said animal an effective amount of a pharmaceutical formulation according to the specification. In yet a further particular embodiment, the specification provides a method for treating breast or gynaecological cancers in a warm blooded animal, such as man, in need of such treatment which comprises administering to said animal an effective amount of a pharmaceutical formulation according to the specification. In yet a further particular embodiment, the specification provides a method for treating cancer of the breast, endometrium, ovary or cervix in a warm blooded animal, such as man, in need of such treatment which comprises administering to said animal an effective amount of a pharmaceutical formulation according to the specification. In yet a further particular embodiment, the specification provides a method for treating breast cancer in a warm blooded animal, such as man, in need of such treatment which comprises administering to said animal an effective amount of a pharmaceutical formulation according to the specification. In yet a further particular embodiment, the specification provides a method for treating breast cancer, wherein the cancer has developed resistance to one or more other endocrine therapies, in a warm blooded animal, such as man, in need of such treatment which comprises administering to said animal an effective amount of a pharmaceutical formulation according to the specification. In yet a further particular embodiment, the specification provides a method for treating ER+ve breast cancer, in a warm blooded animal, such as man, in need of such treatment which comprises administering to said animal an effective amount of a pharmaceutical formulation according to the specification.

In an embodiment of the specification there is provided a pharmaceutical composition according to the specification as hereinbefore defined for use in the production of an anti-proliferative effect in a warm blooded animal such as man. In another embodiment there is provided a pharmaceutical composition according to the specification as hereinbefore defined for use in a warm blooded animal such as man as an anti-invasive agent in the containment and/or treatment of solid tumour disease. In a particular embodiment, there is provided a pharmaceutical composition according to the specification as hereinbefore defined for use in the prevention or treatment of cancer in a warm blooded animal such as man. In a still further embodiment there is provided a pharmaceutical composition according to the specification for use in the prevention or treatment of solid tumour disease in a warm blooded animal such as man. In a particular embodiment, there is provided a pharmaceutical composition according to the specification as hereinbefore defined for use in the prevention or treatment of those tumours which are sensitive to inhibition of ERα that are involved in the signal transduction steps which lead to the proliferation, survival, invasiveness and migratory ability of tumour cells. In yet a further particular embodiment, there is provided a pharmaceutical composition according to the specification as hereinbefore defined for use in providing an inhibitory effect on ERα. In yet a further particular embodiment, there is provided a pharmaceutical composition according to the specification as hereinbefore defined for use in providing an inhibitory effect on ERα. In yet a further particular embodiment, there is provided a pharmaceutical composition according to the specification as hereinbefore defined for use in the treatment of breast or gynaecological cancers. In yet a further particular embodiment, there is provided a pharmaceutical composition according to the specification as hereinbefore defined for use in the treatment of cancer of the breast, endometrium, ovary or cervix. In yet a further particular embodiment, there is provided a pharmaceutical composition according to the specification as hereinbefore defined for the treatment of cancer of the breast. In yet a further particular embodiment, there is provided a pharmaceutical composition according to the specification as hereinbefore defined for the treatment of cancer of the breast, wherein the cancer has developed resistance to one or more endocrine therapies. In yet a further particular embodiment, there is provided a pharmaceutical composition according to the specification as hereinbefore defined for the treatment of ER+ve breast cancer.

A further aspect of the present disclosure provides the use of a composition according to the specification as hereinbefore defined in the manufacture of a medicament for use in the production of an anti-proliferative effect in a warm blooded animal such as man. In another embodiment, there is provided the use of a composition according to the specification as hereinbefore defined in the manufacture of a medicament for use in a warm blooded animal such as man as an anti-invasive agent in the containment and/or treatment of solid tumour disease. In a particular embodiment, there is provided the use of a composition according to the specification as hereinbefore defined in the manufacture of a medicament for use in the prevention or treatment of cancer in a warm blooded animal such as man. In a still further embodiment there is provided the use of a composition according to the specification as hereinbefore defined in the manufacture of a medicament for use in the prevention or treatment of solid tumour disease in a warm blooded animal such as man. In yet a further particular embodiment, there is provided the use of a composition according to the specification as hereinbefore defined in the manufacture of a medicament for use in the prevention or treatment of those tumours which are sensitive to inhibition of ERα that are involved in the signal transduction steps which lead to the proliferation, survival, invasiveness and migratory ability of tumour cells, in a warm blooded animal such as man. In yet a further particular embodiment, there is provided the use of a composition according to the specification as hereinbefore defined in the manufacture of a medicament for use in providing an inhibitory effect on ERα in a warm blooded animal such as man. In yet a further particular embodiment, there is provided the use of a composition according to the specification as hereinbefore defined in the manufacture of a medicament for use in providing an inhibitory effect on ERα in a warm blooded animal such as man. In yet a further particular embodiment, there is provided the use of a composition according to the specification as hereinbefore defined in the manufacture of a medicament for use in the treatment of breast or gynaecological cancers in a warm blooded animal such as man. In yet a further particular embodiment, there is provided the use of a composition according to the specification as hereinbefore defined in the manufacture of a medicament for use in the treatment of cancer of the breast, endometrium, ovary or cervix in a warm blooded animal such as man. In yet a further particular embodiment, there is provided the use of a composition according to the specification as hereinbefore defined in the manufacture of a medicament for the treatment of cancer of the breast in a warm blooded animal such as man. In yet a further particular embodiment, there is provided the use of a composition according to the specification as hereinbefore defined in the manufacture of a medicament for the treatment of cancer of the breast, wherein the cancer has developed resistance to one or more endocrine therapies in a warm blooded animal such as man. In yet a further particular embodiment, there is provided the use of a composition according to the specification as hereinbefore defined in the manufacture of a medicament for the treatment of ER+ve breast cancer in a warm blooded animal such as man.

Pharmaceutical compositions of the present specification may be administered alone as a sole therapy or can be administered in addition with one or more other substances and/or treatments. Such conjoint treatment may be achieved by way of the simultaneous, sequential or separate administration of the individual components of the treatment.

The anti cancer treatment defined herein may be applied as a sole therapy or may involve, in addition to the compounds of the specification, conventional surgery or radiotherapy or chemotherapy. Such chemotherapy may include one or more of the following categories of anti-tumour agents:—

(i) other antiproliferative/antineoplastic drugs and combinations thereof, as used in medical oncology, such as alkylating agents (for example cis platin, oxaliplatin, carboplatin, cyclophosphamide, nitrogen mustard, melphalan, chlorambucil, busulphan, temozolomide and nitrosoureas); antimetabolites (for example gemcitabine and antifolates such as fluoropyrimidines like 5 fluorouracil and tegafur, raltitrexed, methotrexate, cytosine arabinoside, and hydroxyurea); antitumour antibiotics (for example anthracyclines like adriamycin, bleomycin, doxorubicin, daunomycin, epirubicin, idarubicin, mitomycin-C, dactinomycin and mithramycin); antimitotic agents (for example vinca alkaloids like vincristine, vinblastine, vindesine and vinorelbine and taxoids like taxol and taxotere and polokinase inhibitors); and topoisomerase inhibitors (for example epipodophyllotoxins like etoposide and teniposide, amsacrine, topotecan and camptothecin);

(ii) antihormonal agents such as antioestrogens (for example tamoxifen, fulvestrant, toremifene, raloxifene, droloxifene and iodoxyfene), progestogens (for example megestrol acetate), aromatase inhibitors (for example as anastrozole, letrozole, vorazole and exemestane);

(iii) inhibitors of growth factor function and their downstream signalling pathways: included are Ab modulators of any growth factor or growth factor receptor targets, reviewed by Stern et al. Critical Reviews in Oncology/Haematology, 2005, 54, pp 11-29); also included are small molecule inhibitors of such targets, for example kinase inhibitors—examples include the anti erbB2 antibodies trastuzumab [Herceptin™] and pertuzumab [Perjeta™], the HER-2 directed antibody-drug conjugates trastuzumab deruxtecan [Enhertu™] and trastuzumab emtansine [Kadcyla™], the anti-EGFR antibody panitumumab, the anti EGFR antibody cetuximab [Erbitux, C225] and tyrosine kinase inhibitors including inhibitors of the erbB receptor family, such as epidermal growth factor family receptor (EGFR/erbB1) tyrosine kinase inhibitors such as gefitinib, osimertinib or erlotinib, erbB2 tyrosine kinase inhibitors such as lapatinib, and mixed erb1/2 inhibitors such as afatanib; similar strategies are available for other classes of growth factors and their receptors, for example inhibitors of the hepatocyte growth factor family or their receptors including c-met and ron; inhibitors of the insulin and insulin growth factor family or their receptors (IGFR, IR) inhibitors of the platelet-derived growth factor family or their receptors (PDGFR), and inhibitors of signalling mediated by other receptor tyrosine kinases such as c-kit, AnLK, and CSF-1R;

also included are modulators which target signalling proteins in the PI3-kinase signalling pathway, for example, inhibitors of PI3-kinase isoforms such as PI3K-α/β/γ and ser/thr kinases such as AKT, mTOR (such as AZD2014 & everolimus), PDK, SGK, PI4K or PIP5K; also included are inhibitors of serine/threonine kinases not listed above, for example raf inhibitors such as vemurafenib, MEK inhibitors such as selumetinib, Abl inhibitors such as imatinib or nilotinib, Btk inhibitors such as ibrutinib, acalabrutinib or zanubrutinib, Syk inhibitors such as fostamatinib, aurora kinase inhibitors (for example AZD1152), inhibitors of other ser/thr kinases such as JAKs, STATs and IRAK4, and cyclin dependent kinase inhibitors such as palbociclib, abemaciclib, ribociclib, trilaciclib or lerociclib;

(iv) modulators of DNA damage signalling pathways, for example PARP inhibitors (e.g. olaparib, rucaparib, niraparib, talazoparib), ATR inhibitors or ATM inhibitors;

(v) modulators of apoptotic and cell death pathways such as Bcl family modulators (e.g. ABT-263/Navitoclax, ABT-199);

(vi) antiangiogenic agents such as those which inhibit the effects of vascular endothelial growth factor, [for example the anti vascular endothelial cell growth factor antibody bevacizumab (Avastin™) and for example, a VEGF receptor tyrosine kinase inhibitor such as sorafenib, axitinib, pazopanib, sunitinib and vandetanib (and compounds that work by other mechanisms (for example linomide, inhibitors of integrin αvβ3 function and angiostatin)];

(vii) vascular damaging agents, such as Combretastatin A4;

(viii) anti-invasion agents, for example c-Src kinase family inhibitors like (dasatinib, J. Med. Chem., 2004, 47, 6658-6661) and bosutinib (SKI-606), and metalloproteinase inhibitors like marimastat, inhibitors of urokinase plasminogen activator receptor function or antibodies to Heparanase;

(ix) immunotherapy approaches, including for example ex vivo and in vivo approaches to increase the immunogenicity of patient tumour cells, such as transfection with cytokines such as interleukin 2, interleukin 4 or granulocyte macrophage colony stimulating factor, approaches to decrease T cell anergy, approaches using transfected immune cells such as cytokine transfected dendritic cells, approaches using cytokine transfected tumour cell lines and approaches using anti idiotypic antibodies. Specific examples include monoclonal antibodies targeting PD-1 (e.g. pembrolizumab, nivolumab, cemiplimab), PD-L1 (e.g. durvalumab, atezolizumab or avelumab) or CTLA4 (e.g. ipilimumab and tremelimumab);

(x) Antisense or RNAi based therapies, for example those which are directed to the targets listed.

(xi) gene therapy approaches, including for example approaches to replace aberrant genes such as aberrant p53 or aberrant BRCA1 or BRCA2, GDEPT (gene directed enzyme pro drug therapy) approaches such as those using cytosine deaminase, thymidine kinase or a bacterial nitroreductase enzyme and approaches to increase patient tolerance to chemotherapy or radiotherapy such as multi drug resistance gene therapy.

In the instances where Compound (I) is administered in combination with other therapeutic agents, Compound (I) need not be administered via the same route as other therapeutic agents, and may, because of different physical and chemical characteristics, be administered by a different route. For example, Compound (I) may be administered orally to generate and maintain good blood levels thereof, while the other therapeutic agent may be administered intravenously. The initial administration may be made according to established protocols known in the art, and then, based upon the observed effects, the dosage, modes of administration and times of administration can be modified by the skilled clinician.

The particular choice of other therapeutic agent will depend upon the diagnosis of the attending physicians and their judgment of the condition of the individual and the appropriate treatment protocol. According to this aspect of the specification there is provided a combination suitable for use in the treatment of cancer comprising Compound (I) or a pharmaceutically acceptable salt thereof and another anti-tumour agent, in particular any one of the anti tumour agents listed under (i)-(xi) above. In particular, the anti-tumour agent listed under (i)-(xi) above is the standard of care for the specific cancer to be treated; the person skilled in the art will understand the meaning of "standard of care".

Therefore in a further aspect of the specification there is provided a combination suitable for the treatment of cancer comprising a composition of the present specification and another anti-tumour agent, in particular an anti-tumour agent selected from one listed under (i)-(xi) herein above.

In a further aspect of the specification there is provided a combination suitable for the treatment of cancer comprising a composition of the present specification as defined herein before and any one of the anti tumour agents listed under (i) above.

In a further aspect of the specification there is provided a combination suitable for use in the treatment of cancer comprising a composition of the present specification as defined hereinbefore and a taxoid, such as for example taxol or taxotere, conveniently taxotere.

In a further aspect of the specification there is provided a combination suitable for the treatment of cancer comprising composition of the present specification and another anti-tumour agent, in particular an anti-tumour agent selected from one listed under (ii) herein above.

In a further aspect of the specification there is provided a combination suitable for use in the treatment of cancer comprising a composition of the present specification as defined herein before and any one of antihormonal agents listed under (ii) above, for example any one of the anti-oestrogens listed in (ii) above, or for example an aromatase inhibitor listed in (ii) above.

In a further aspect of the specification there is provided a combination suitable for use in the treatment of cancer comprising a composition of the present specification and an mTOR inhibitor, such as AZD2014 or everolimus.

In a further aspect of the specification there is provided a combination suitable for use in the treatment of cancer comprising a composition of the present specification and a PI3Kα-inhibitor, such as those PI3K α/δ inhibitors in WO 2014/114928. One example of a suitable PI3K α/δ inhibitor is Example 3 from WO 2014/114928.

In a further aspect of the specification there is provided a combination suitable for use in the treatment of cancer comprising a composition of the present specification and palbociclib, abemaciclib or ribociclib.

In one aspect the above combination of a composition of the present specification and an anti-tumour agent listed in (ii) above, or a mTOR inhibitor (such as AZD2014 or everolimus), or a PI3Kα-inhibitor (such as those PI3K α/δ inhibitors in WO 2014/114928, particularly Example 3 therein) or palbociclib, abemaciclib or ribociclib, is suitable for use in the treatment of breast or gynaecological cancers, such as cancer of the breast, endometrium, ovary or cervix, particularly breast cancer, such as ER+ve breast cancer.

Herein, where the term "combination" is used it is to be understood that this refers to simultaneous, separate or sequential administration. In one aspect of the specification "combination" refers to simultaneous administration. In another aspect of the specification "combination" refers to separate administration. In a further aspect of the specification "combination" refers to sequential administration. Where the administration is sequential or separate, the delay in administering the second component should not be such as to lose the beneficial effect of the combination. Where a combination of two or more components is administered separately or sequential, it will be understood that the dosage regime for each component may be different to and independent of the other components. Conveniently, the compounds of the present specification are dosed once daily.

Therefore in an additional feature of the specification, there is provided a method of treating cancer in a warm blooded animal, such as man, in need of such treatment which comprises administering to said animal an effective amount of a composition of the present specification in combination with an anti-tumour agent selected from one listed under (i)-(xi) herein above.

According to a further aspect of the specification there is provided a method of treating cancer in a warm blooded animal, such as man, in need of such treatment which comprises administering to said animal an effective amount of a composition of the present specification in combination with any one of the antihormonal agents listed under (ii) above, for example any one of the anti-oestrogens listed in (ii) above, or for example an aromatase inhibitor listed in (ii) above.

In a further aspect of the specification there is provided a method of treating cancer in a warm blooded animal, such as man, in need of such treatment which comprises administering to said animal an effective amount of a composition of the present specification in combination with an mTOR inhibitor, such as AZD2014 or everolimus, for example everolimus at a daily dose of up to 10 mg.

In a further aspect of the specification there is provided a method of treating cancer in a warm blooded animal, such as man, in need of such treatment which comprises administering to said animal an effective amount of a composition of the present specification in combination with a PI3Kα-inhibitor, such as those PI3K α/δ inhibitors in WO 2014/114928. One example of a suitable PI3K α/δ inhibitor is Example 3 from WO 2014/114928.

In a further aspect of the specification there is provided a method of treating cancer in a warm blooded animal, such as man, in need of such treatment which comprises administering to said animal an effective amount of a composition of the present specification in combination with palbociclib, abemaciclib or ribociclib.

In one aspect the above methods of treating cancer, are methods for the treatment of breast or gynaecological cancers, such as cancer of the breast, endometrium, ovary or cervix, particularly breast cancer, such as ER+ve breast cancer.

In one embodiment, the compositions and methods described herein provide kits for the treatment of disorders, such as the ones described herein. These kits comprise a composition described herein in a container and, optionally, instructions teaching the use of the kit according to the various methods and approaches described herein. Such kits may also include information, such as scientific literature references, package insert materials, clinical trial results, and/or summaries of these and the like, which indicate or establish the activities and/or advantages of the composition, and/or which describe dosing, administration, side effects, drug interactions, or other information useful to the health care provider. Such information may be based on the results of various studies, for example, studies using experimental animals involving in vivo models and studies based on human clinical trials. Kits described herein can be provided, marketed and/or promoted to health providers, including physicians, nurses, pharmacists, formulary officials, and the like. Kits may also, in some embodiments, be marketed directly to the consumer.

The compositions of the specification may be utilized for diagnostics and as research tools. For example, the compositions containing the Compound (I), either alone or in combination with other compounds, can be used as tools in differential and/or combinatorial analyses to elucidate expression patterns of genes expressed within cells and tissues.

Besides being useful for human treatment, compositions of the specification, may be useful for veterinary treatment of companion animals, exotic animals and farm animals, including mammals, rodents, and the like. Conveniently, such animals include horses, dogs, and cats.

Examples

N-(1-(3-fluoropropyl)azetidin-3-yl)-6-((6S,8R)-8-methyl-7-(2,2,2-trifluoroethyl)-6,7,8,9-tetrahydro-3H-pyrazolo[4,3-f]isoquinolin-6-yl)pyridin-3-amine (Compound (I)) may be prepared in accordance with the methods disclosed in WO2018/077630A1 (Example No. 17).

After preliminary screening studies a number of prototype formulations comprising Compound (I), fillers, disintegrants and lubricants were prepared by a dry granulation process for assessment.

In these prototype formulations, the amount of Compound (I) was maintained at 27% w/w and the total amount of filler was set at 65.5% w/w with the remaining 6.5% w/w being disintegrant (5%) and lubricant (1.5%). Tablets could then be formed from the resultant blends by roller compaction as detailed below. The excipients were selected after modelling studies suggested that the resultant formulations would deliver a 3 year shelf life.

Test formulation blends A to D with the compositions set out in Table 1 were prepared by dry granulation. Compound (I) was used in crystalline Form A.

TABLE 1

Prototype formulations comprising Compound (I)

| Prototype # | Compound (I) (%) | Mannitol (%) | MCC (%) | DCPA (%) | CCS (%) | SSG (%) | MgSt (%) | Roll Force (kN/cm) |
|---|---|---|---|---|---|---|---|---|
| A | 27 | 43.22 | 23.28 | 0 | 5 | 0 | 1.5 | 7 |
| B | 27 | 43.22 | 23.28 | 0 | 0 | 5 | 1.5 | 7 |
| C | 27 | 0 | 39.9 | 26.6 | 0 | 5 | 1.5 | 7 |
| D | 27 | 25.4 | 31.1 | 10 | 0 | 5 | 1.5 | 7 |

MCC = microcrystalline cellulose;
DCPA = dicalcium phosphate anhydrous;
CCS = cross carmellose sodium;
SSG = sodium starch glycolate;
MgSt = magnesium stearate Example 1: Tablets were be prepared by using a dry mixing/direct compression as follows: Compound (I) was dry mixed with the excipients listed in the table (excluding the magnesium stearate) using a TURBULA® T2 blender (www.wab-group.com) at a speed of 30 rpm for 10 minutes. Magnesium stearate was then added to the mix and blending was continued for a further 5 minutes at 30 rpm. The dry mix was compressed to form 370.4 mg tablets using a Killian STYL'One press (www.romaco.com) equipped with 13×7.5 mm oval punch at a compression pressure of between 120 to 250 MPa.

Example 2: Tablets were manufactured using a dry mixing/roller compaction process as follows:

Compound (I) was dry mixed with the excipients listed in the table (excluding the magnesium stearate) using a TUR- BULA® T2 blender at a speed of 30 rpm for 10 minute, a portion of magnesium stearate (0.5% of the batch weight) was added and mixing was continued for a further 5 minutes at 30 rpm. The mixture was roller compacted using Gerteis Mini-Pactor® (www.gerteis.com) with a roller pressure of 7 kN/cm, a gap size of 2 mm and a roller speed of 2 rpm. The resulting ribbons were subsequently milled into granules by passing the ribbons through the mill attached to the roller compactor. The resulting granules were returned to the TURBULA® T2 blender, the remaining aliquot of magnesium stearate added (1% of batch weight), and mixing continued at 30 rpm for 5 minutes. the lubricated granules were compressed to form 370.4 mg tablets using a Piccola Riva Classic press (riva-europe.co.uk/products/piccola-classic-tablet-press) equipped with 13×7.5 mm oval punches.

The non-compressed blends were assessed for flow (FIG. 1) and wall friction angle to assess the impact of excipient on blend flow into the roller compactor. Flow function coefficients (FFC) for the blends was determined using a Schultz RST-XS ring shear tester (www.dietmar-schulze.com/rstxse.html) at normal stresses at pre-shear stresses of 1000, 2000 and 4000 Pa according to the manufacturer's instructions. The results (see FIG. 1) revealed that all tested formulations, A to D, had acceptable flow properties for roller compaction with a blend flow function coefficient (FFC) of 4 or above being desirable, albeit prototype C, that comprises a combination of MCC and DCPA as filler, exhibited a significantly higher (and therefore more favourable) FFC than the other prototypes. This result highlights the MCC/DCPA system in prototype C as having potential as a robust formulation option for a roller compaction manufacturing process with the flow properties required for eventual transfer to a continuous direct compression (CDC) tableting process. In addition to the flow properties of the blend, the strain rate sensitivity (SRS), as discussed further below, is a key determinant in the assessment of whether a particular formulation is amenable to transfer to a CDC manufacturing process as the speed at which the materials can be blended together to produce an homogeneous blend for compression/tableting determines the process throughput.

Continuous direct compression (CDC) is a highly desirable tableting option as a constant feed of the active ingredient and excipients can be input into a process that combines both the blending/granulation process and the compression/tableting step to deliver the desired tablets as output. Additional milling and sieving steps can be incorporated into the CDC process as required. Advantages of CDC include the removal of the need to transfer material between equipment and elimination of potential material loss and the delivery of an accelerated, reduced footprint, streamlined process that can reduce cost of goods. Good flow properties are essential for reproducibility of tableting via a CDC process.

The wall friction angles (WFA) of the blends was also assessed and in all cases was measured in the range of 65% to 68%, a value associated with moderate adhesion properties. The prototype blends therefore all had acceptable FFC and WFA values.

The prototype blends were then subjected to roller compaction under a constant roll force of 7 kN/cmor direct compaction under a compression pressure of 120-250 MPa as described above.

The ejection force data for the manufactured tablets produced from prototype blends by the roller compaction process described above is presented in FIG. 2. An ejection force of <800N was selected as a target to avoid punch sticking and tablet defect during the compression process. The results showed that increased quantities of DCPA in the formulation delivered a reduction in the ejection force, with the MCC/DCPA blend delivering an ejection force of below 800 N while the MCC/mannitol blends A and B had an ejection around 1000 N.

The porosity of the tablets was determined from the apparent density and true density of tablet using the following equation (I):

$$\text{Porosity} = 100 \times (\text{apparent density/true density}) \quad (I)$$

The true density of the tablets (II) was obtained by helium pycnometry using a AccuPyc II 1345 Pycnometer (see www.micromeritics.com/Product-Showcase/AccuPyc-II-1340.aspx for details for details) a technique that allows the volume of the tablet excluding surface and internal pores via gas displacement.

$$\text{True density} = \text{mass/volume of solids} \quad (II)$$

In contrast when the tablet volume is calculated using the standard equation (III) below pores on the surface of, and in the interior of, the tablet are included.

$$\text{Tablet volume} = (((2\pi(\text{height of cap})2c(3 \times \text{radius of curvature} - \text{height of cap}))/3) + ((\pi(\text{diameter}/2)2) \times (\text{thickness} - 2 \times \text{height of cap})) \quad (III)$$

Eleven tablets were weighed accurately, placed in the sample cup previously used for calibration and analysed according to the manufacturer's instructions.

The tablet envelope density (the apparent density) was calculated for 10 tablets individually from each tablet's dimensions and from their weights using the following equations:

$$\text{Apparent density} = \text{mass of tablets} \div \text{envelop volume of tablets} \quad (IV)$$

Hardness and Tensile strength: A Sotax HT100 (www.sotax.com) was used to determine the weight, hardness, thickness and diameter of 10 tablets produced from formulations A to D via roller compaction. The tensile strength was calculated from the hardness data and tablets dimensions generated from the Sotax HT100 and the compression tools dimensions using Pitt's equation (see K. G. Pitt & M. G. Heasley Powder Technology, 2013 (238) p 169-175).

As can be seen from FIG. 3, of the four prototype formulation batches only formulation C, comprising MCC and DCPA as filler consistently delivered tablets with the target tensile strengths of >2 MPa. The tablets are 100 mg strength tablets (370.4 mg compression weight) produced according to Example 1 above. Advantageously, the porosity of the tablets produced with formulation C also proved higher than that of the other tablets batch, indicating a lower risk of over compression for formulation C a property that is desirable for reproducible release properties.

Having established the physical properties of the blends that facilitate robust and reproducible properties for manufacture of tablets from the blends of Compound (I) with MCC/DCPA, dissolution experiments were performed to establish the disintegration of the molecules using a USP 2 apparatus. Tablets prepared from Formulation C by roller compaction delivered the desired 85% dissolution in 30 minutes that is characteristic of an immediate release formulation.

To expand on the already advantageous profile of formulations of Compound (I) with MMC/DCPA as filler, experiments were performed to determine whether the MCC/DCPA formulations would also deliver formulation blends with strain rate sensitivity of ca 20% or less that would allow for high speed manufacture, for example by roller compaction by continuous direct compression. In addition, confirmation of the design space for formulations that would on compaction delivers tablets with high tensile strength (>2 MPa) was required. A second set of formulations as detailed in Table 2 as well as tablets were thus prepared as per Examples 1 and 2 above. This set of formulations allowed the optimal ratios of MCC to DCPA to be established.

TABLE 2

Prototype Formulations E, F, C, G and H comprising AZD9833 and various ratios of MCC to DCPA

| Proto-type # | AZD9833 (%) | MCC (%) | DCPA (%) | SSG (%) | MgSt (%) | DCPA ratio (1-MCC ratio) |
|---|---|---|---|---|---|---|
| E (14) | 27 | 66.5 | 0 | 5 | 1.5 | 0.0 |
| F (13) | 27 | 49.875 | 16.625 | 5 | 1.5 | 0.25 |
| C (11) | 27 | 39.9 | 26.6 | 5 | 1.5 | 0.40 |
| G (15) | 27 | 26.6 | 39.9 | 5 | 1.5 | 0.60 |
| H (16) | 27 | 9.975 | 56.525 | 5 | 1.5 | 0.85 |

SSG = sodium starch glycolate;
MgSt = Magnesium stearate

The strain rate sensitivity (SRS) of each component in the formulation was calculated from the equation below:

$$SRS = 100(Py(fast) - Py(slow))/Py(slow)$$

wherein yield pressures, Py, were determined by the Heckel method using a compaction simulator (Phoenix, performed as a service by Merlin Powder Characterisation Ltd, see www.merlin-pc.com/services/strain-rate-sensitivity) equipped with a 10 mm diameter, round, flat-faced punch and die set. In more detail, aliquots of the individual components of each of Formulations E, F, C, G and H (approximately 327 mg) were compressed to theoretical zero porosity at punch speeds of 300 (fast) and 0.1 (slow) mm per second. Yield pressure (Py) was calculated across the punch pressure range of 25 to 75 MPa. The overall strain rate sensitivity of the formulations was then calculated based on the volumetric proportions of each component in the formulations.

The strain rate sensitivities of Formulations E, F, C, G and H measured by the technique described above are shown in FIG. 4 below. As can be seen from FIG. 4, compositions with 25% or more of DCPA as filler, i.e. those composition with a maximum ratio of 3 MCC to 1 DCPA or MCC:DCPA of 3:1, give the desired strain rate sensitivity of ca 20% or less.

The tensile strength of tablets prepared from Formulations E, F, C, G and H by direct compaction were also measured and are presented in FIG. 5. As can be seen from FIG. 5, all of the Formulations delivered tablets with a tensile strength of 2 MPa or more, with tensile strength being observed to increase as a function of MCC content. The data from FIGS. 4 and 5 are presented together in FIG. 6 to illustrate the compositions that possess optimal SRS and that deliver tablets with desirable tensile strength. Tablets prepared by the process of Example 2 above, using roller compaction also exhibited the desired tensile strength of >2 MPa.

A final confirmation of the properties of the MCC/DCPA containing formulations was allowed by dissolution experiments. The dissolution experiments described herein were performed on a United States Pharmacopeia using Apparatus II (paddle), with either 900 mL of pH 6.8 phosphate buffer (50 mM $NaH_2PO_4$) or simulated gastric fluid (SGF) at a temperature of 37° C. Samples (15 mL) of the dissolution media were withdrawn at 0, 5, 10, 15, 20, 30, 45, 60 and 90 minutes, filtered through a syringe filter (10 μm UHMWPE cannula+0.45 μm PES syringe), discarding the first 6 mL. The concentration of drug substance in the remaining solution was quantified by UV analysis (Cary 60 UV spectrophotometer) at a wavelength of 253 nm (pH 6.8) or 263 nm (SGF) versus a standard solution. Stir speed increased to 250 rpm after 60 minute samples taken. Generally, the dissolution results disclosed in this specification are based on an average of three repeated tests.

The results from the dissolution experiments performed on Formulations E, F, C, G and H is presented in FIGS. 7a and 7b. An immediate release profile with at least 85% dissolution achieved in 30 minutes was targeted. As can be seen from FIG. 7a, the rate of dissolution in the USP 2 apparatus is reduced as a function of increasing DCPA content in the in vitro, USP 2, study. It is believed that this decrease in dissolution observed after 30 minutes arises from conning, a known issue with dissolution tests where undissolved material forms a mound in the stagnant zone below the paddle in the USP 2 equipment, which inhibits dissolution. As can be seen from FIG. 7a, the coning effect can be overcome by increasing the stirring speed (as was done at the 60 minute time point). Although conning is specific to the in vitro setting and should not impair in vivo release performance it is desirable to have a reproducible dissolution profile (>85% in 30 minutes in the USP 2 apparatus) for the purposes of quality assurance, i.e. to ensure inter batch performance before batch release. The conning effect observed for the formulation with higher amounts of DCPA is believed to derive from the formation of a high density zone below the paddle in the USP 2 apparatus in which undissolved material collects, this high density zone is only adequately disturbed when the stirring speed is increased. As can be seen from FIG. 7b, the MCC:DCPA ratios that provide 85% dissolution in 30 minutes and that also have the desired strain rate sensitivity (from FIG. 4) and tensile strength (FIG. 5) are those with an MCC:DCPA ratio of 3:1 to 3:2.

Beige Opadry II coating was selected for preliminary development studies. The coating was performed on 20 and 100 mg tablet strengths using O'Hara Labcoat (www.oharatech.com) at coat supplier's recommended parameters. Both strengths were coated successfully without any observed appearance defects. The composition of the tablets is presented in Table 3 below.

TABLE 1

Quantitative and qualitative composition of AZD9833 beige film coated tablets

| Material | Function | Grade | % w/w |
|---|---|---|---|
| AZD9833 | API | AZ | 27.0 |
| MCC | Filler | Avicel PH-102 | 39.9 |
| DCPA | Filler | Calipharm A | 26.6 |
| SSG | Disintegrant | Glycolys LV | 5.0 |
| Magnesium stearate | Extra-granular lubricant | Peter Greven | 0.5 |
| Magnesium stearate | Extra-granular lubricant | Peter Greven | 1.0 |
| Beige Opadry II | Coat | Coloron | 4.9% w/w (20 mg) 3.3 w/w (100 mg) |

The dissolution performance in SGF of the coated tablets of Table 3 is presented in FIG. 8. Both 20 mg and 100 mg tablet strengths showed immediate release profile with >85% release in 30 minutes with comparable profile to the uncoated tablets (see prototype C in FIG. 7). The experiment was performed with stirring at 50 rpm for the first 60 minutes, at which stage the stirring rate was increased to 200 rpm. Signs of conning for the 100 mg tablet strength were observed, albeit the target dissolution profile was still obtained.

Preliminary results from a relative bioavailability study in human volunteers revealed that there was no significant difference in measured AZD9833 plasma levels following administration of equal doses of AZD9833 as either an oral solution or as tablets. The tablets evaluated in the study were manufactured by either Direct Compression (DC, the properties of which are representative of tablets manufactured by Continuous Direct Compression (CDC)) or Roller Compaction (RC) from formulations according to the specification. The equivalence in drug exposure between tablets and oral solutions confirms the utility of formulations according to the specification in the clinical setting and also the equivalence of tablets manufactured by RC and DC in terms of their delivery profiles. Doses of AZD9833 administered in the study were 75 mg (tablets and solution) and 300 mg (tablets only).

The invention claimed is:

1. A pharmaceutical tablet comprising N-(1-(3-fluoropropyl)-azetidin-3-yl)-6-((6S,8R)-8-methyl-7-(2,2,2-trifluoroethyl)-6,7,8,9-tetrahydro-3H-pyrazolo[4,3-f]isoquinolin-6-yl)pyridin-3-amine, microcrystalline cellulose, and dicalcium phosphate anhydrous; wherein the tablet contains 75 mg of N-(1-(3-fluoropropyl) azetidin-3-yl)-6-((6S,8R)-8-methyl-7-(2,2,2-trifluoroethyl)-6,7,8,9-tetrahydro-3H-pyrazolo[4,3-f]isoquinolin-6-yl)pyridin-3-amine; and wherein the ratio of microcrystalline cellulose to dicalcium phosphate anhydrous is from 3:1 to 2:3.

2. The tablet of claim 1, wherein the tablet is an immediate release tablet.

3. The tablet of claim 1, wherein the amount of N-(1-(3-fluoropropyl) azetidin-3-yl)-6-((6S,8R)-8-methyl-7-(2,2,2-trifluoroethyl)-6,7,8,9-tetrahydro-3H-pyrazolo [4,3-f]isoquinolin-6-yl)pyridin-3-amine is up to 60% w/w based on the weight of the tablet.

4. The tablet of claim 1, wherein the amount of N-(1-(3-fluoropropyl) azetidin-3-yl)-6-((6S,8R)-8-methyl-7-(2,2,2-trifluoroethyl)-6,7,8,9-tetrahydro-3H-pyrazolo [4,3-f]isoquinolin-6-yl)pyridin-3-amine is 27% w/w based on the weight of the tablet.

5. The tablet of claim 1, wherein the ratio of microcrystalline cellulose to dicalcium phosphate anhydrous is from 3:1 to 3:2.

6. The tablet of claim 1, wherein the combined amount of microcrystalline cellulose and dicalcium phosphate anhydrous in the tablet is from 15% w/w to 85% w/w based on the weight of the tablet.

7. The tablet of claim 1, wherein the combined amount of microcrystalline cellulose and dicalcium phosphate anhydrous is from 40% w/w to 85% w/w based on the weight of the tablet.

8. The tablet of claim 1, further comprising at least one disintegrant in an amount of up to 10% w/w based on the weight of the tablet.

9. The tablet of claim 8, wherein the at least one disintegrant is sodium starch glycolate.

10. The tablet of claim 8, wherein the at least one disintegrant is present in an amount of up to 5% w/w based on the weight of the tablet.

11. The tablet of claim 1, further comprising at least one lubricant in an amount of up to 4% w/w based on the weight of the tablet.

12. The tablet of claim 11, wherein the at least one lubricant is magnesium stearate.

13. The tablet of claim 11, wherein the at least one lubricant is present in an amount of up to 1.5% w/w based on the weight of the tablet.

14. The tablet of claim 1, wherein the tablet is coated.

15. The tablet of claim 2 wherein:
the combined amount of microcrystalline cellulose and dicalcium phosphate anhydrous is from 40% w/w to 85% w/w based on the weight of the tablet; and
the ratio of microcrystalline cellulose to dicalcium phosphate anhydrous is from 3:1 to 3:2.

16. The tablet of claim 15, wherein the tablet further comprises at least one disintegrant in an amount of up to 5% w/w based on the weight of the tablet.

17. The tablet of claim 16, wherein the at least one disintegrant is selected from croscarmellose sodium, crospovidone, and sodium starch glycolate.

18. The tablet of claim 16, wherein the tablet further comprises at least one lubricant in an amount of up to 1.5% w/w based on the weight of the tablet.

19. The tablet of claim 18, wherein the at least one lubricant is selected from magnesium stearate, calcium stearate, and sodium stearyl fumarate.

20. The tablet of claim 2, wherein:
the combined amount of microcrystalline cellulose and dicalcium phosphate anhydrous is from 40% w/w to 85% w/w based on the weight of the tablet;
the ratio of microcrystalline cellulose to dicalcium phosphate anhydrous is from 3:1 to 3:2;
the tablet further comprises at least one disintegrant in an amount of up to 5% w/w, wherein the disintegrant is selected from croscarmellose sodium, crospovidone, and sodium starch glycolate; and
the tablet further comprises at least one lubricant in an amount of up to 1.5% w/w based on the weight of the tablet, wherein the at least one lubricant is selected from magnesium stearate, calcium stearate, and sodium stearyl fumarate.

21. The tablet of claim 20, wherein the tablet is coated.

* * * * *

UNITED STATES PATENT AND TRADEMARK OFFICE
CERTIFICATE OF CORRECTION

| | | |
|---|---|---|
| PATENT NO. | : 12,453,729 B2 | Page 1 of 1 |
| APPLICATION NO. | : 17/237201 | |
| DATED | : October 28, 2025 | |
| INVENTOR(S) | : Farhan Abdel Karim Mohammad Al Husban | |

It is certified that error appears in the above-identified patent and that said Letters Patent is hereby corrected as shown below:

On the Title Page ( * ) Notice Section, the following statement should be deleted:
"This patent is subject to a terminal disclaimer"

Signed and Sealed this
Twenty-third Day of December, 2025

John A. Squires
*Director of the United States Patent and Trademark Office*